(12) United States Patent
Goulanian et al.

(10) Patent No.: US 9,055,288 B2
(45) Date of Patent: Jun. 9, 2015

(54) SWITCHABLE 3D/2D OPTICAL IMAGING SYSTEM

(75) Inventors: Emine Goulanian, Richmond (CA); Abdelmounaime Faouzi Zerrouk, Lausanne (CH); Nikolai Kostrov, Richmond (CA); Pavel Trochtchanovitch, Richmond (CA)

(73) Assignee: Zecotek Display Systems Ltd Pte

( * ) Notice: Subject to any disclaimer, the term of this patent is extended or adjusted under 35 U.S.C. 154(b) by 0 days.

(21) Appl. No.: 13/546,877

(22) Filed: Jul. 11, 2012

(65) Prior Publication Data

US 2012/0275004 A1 Nov. 1, 2012

Related U.S. Application Data

(63) Continuation of application No. 11/769,672, filed on Jun. 27, 2007, now Pat. No. 8,243,127.

(60) Provisional application No. 60/863,204, filed on Oct. 27, 2006.

(51) Int. Cl.
| | |
|---|---|
| *G02B 27/22* | (2006.01) |
| *H04N 13/04* | (2006.01) |
| *G03B 33/12* | (2006.01) |
| *G03B 35/24* | (2006.01) |
| *G09G 3/22* | (2006.01) |

(52) U.S. Cl.
CPC ........ *H04N 13/0454* (2013.01); *G02B 27/2214* (2013.01); *G03B 33/12* (2013.01); *G03B 35/24* (2013.01); *G09G 3/22* (2013.01); *G09G 2320/028* (2013.01); *H04N 13/0404* (2013.01); *H04N 13/0429* (2013.01); *H04N 13/0456* (2013.01)

(58) Field of Classification Search
USPC .......... 359/209.1, 210.1, 463, 619, 621, 622, 359/626
See application file for complete search history.

(56) References Cited

U.S. PATENT DOCUMENTS

| | | | |
|---|---|---|---|
| 2,198,678 A | 4/1940 | Noaillon | |
| 3,632,866 A | 1/1972 | King et al. | |
| 3,932,699 A | 1/1976 | Tripp | |
| 4,160,973 A | 7/1979 | Berlin, Jr. | |

(Continued)

FOREIGN PATENT DOCUMENTS

WO     WO 2007/003792     1/2007

OTHER PUBLICATIONS

Whearston, Contributions to the Physiology of Vision, journal, 1838, 371-394, 128, Royal Society of London, London.

(Continued)

*Primary Examiner* — Frank Font
(74) *Attorney, Agent, or Firm* — Thomas E. Loop

(57) ABSTRACT

The present invention is directed a switchable 3D/2D optical imagining system having high functional flexibility in a number of aspects and adaptability to various applications. The present invention is based on generating directional optional beams, transforming these optical beams and projecting transformed optical beams in a field of view to thereby divide the field of view into one or more adjustable viewing zones and to form 2-dimensional (2D) images or perspective views of a 3-dimensional (3D) image of an object or scene herein. The present invention is embodied in the switchable optical imaging system and 3D/2D image switchable apparatus using the same system.

10 Claims, 14 Drawing Sheets

(56) References Cited

U.S. PATENT DOCUMENTS

| | | |
|---|---|---|
| 5,132,839 A | 7/1992 | Travis |
| 5,500,765 A | 3/1996 | Eichenlaub |
| 5,581,378 A | 12/1996 | Kulick et al. |
| 5,703,717 A | 12/1997 | Ezra et al. |
| 5,712,732 A | 1/1998 | Street |
| 5,742,332 A | 4/1998 | Imai et al. |
| 5,745,197 A | 4/1998 | Leung et al. |
| 5,930,037 A | 7/1999 | Imai |
| 6,061,083 A | 5/2000 | Aritake et al. |
| 6,061,179 A | 5/2000 | Inoguchi |
| 6,069,650 A | 5/2000 | Battersby |
| 6,268,881 B1 | 7/2001 | Muramoto |
| 6,337,721 B1 | 1/2002 | Hamagashi et al. |
| 6,476,850 B1 | 11/2002 | Erbey |
| 6,487,020 B1 | 11/2002 | Favalora |
| 6,533,420 B1 | 3/2003 | Eichenlaub |
| 6,552,348 B2 | 4/2003 | Cherry et al. |
| 6,574,042 B2 | 6/2003 | Allio |
| 6,744,053 B2 | 6/2004 | Wong et al. |
| 6,831,678 B1 | 12/2004 | Travis |
| 6,909,097 B2 | 6/2005 | Schreiner et al. |
| 6,940,646 B2 * | 9/2005 | Taniguchi et al. ............ 359/463 |
| 6,946,658 B2 | 9/2005 | Tai |
| 7,038,212 B2 | 5/2006 | Wollenweber et al. |
| 7,049,600 B2 | 5/2006 | Levin |
| 7,050,020 B2 | 5/2006 | Uehara et al. |
| 8,274,556 B2 * | 9/2012 | Cha et al. ...................... 348/54 |
| 2002/0190214 A1 | 12/2002 | Wieczorek et al. |
| 2005/0285997 A1 | 12/2005 | Koyama et al. |
| 2006/0087499 A1 | 4/2006 | Chen et al. |
| 2006/0114415 A1 | 6/2006 | Shestak et al. |
| 2006/0176557 A1 | 8/2006 | Travis et al. |
| 2006/0202910 A1 | 9/2006 | Cha et al. |
| 2006/0232859 A1 * | 10/2006 | Ebina et al. .................. 359/455 |
| 2006/0244958 A1 | 11/2006 | Furman et al. |
| 2007/0008617 A1 | 1/2007 | Shestak et al. |
| 2007/0008619 A1 | 1/2007 | Cha et al. |
| 2007/0008620 A1 | 1/2007 | Shestak et al. |
| 2007/0019856 A1 | 1/2007 | Furman et al. |
| 2007/0183033 A1 * | 8/2007 | Schwerdtner ................. 359/463 |
| 2008/0204872 A1 * | 8/2008 | Ijzerman et al. ............. 359/463 |
| 2008/0218855 A1 * | 9/2008 | Van Berkel ................... 359/463 |
| 2010/0195203 A1 * | 8/2010 | Zuidema et al. ............. 359/463 |

OTHER PUBLICATIONS

Lizuka, Using Cellophane to Convert a Liquid Crystal Display Screen into a Three-Dimensional Display (3D Laptop Computer and 3D Camera Phone), Journal, 2006, Canada.

* cited by examiner

SWITCHABLE 3D/2D OPTICAL IMAGING SYSTEM

CROSS-REFERENCE TO RELATED APPLICATIONS

This application is a continuation of U.S. application Ser. No. 11/769,672 (pending) filed on Jun. 27, 2007, which application claims the benefit of U.S. Provisional Application No. 60/863,204 filed on Oct. 27, 2006, which applications are all incorporated herein by reference in their entireties for all purposes.

FIELD OF THE INVENTION

The present invention relates to autostereoscopic systems and, more specifically, to a switchable optical imaging system and a related 3D/2D image switchable apparatus (3D/2D display) having high functional flexibility in a number of aspects and adaptability to various applications.

BACKGROUND OF THE INVENTION

There are several optical imaging systems known in the prior art that relate to switchable 3D/2D displays and display apparatuses, including (1) those based on parallax barriers such as, for example, those described in U.S. Patent Application Nos. US2005/0285997, US2006/0087499, US2006/0114415, US2006/0176557, US2007/0008619, and (2) those based on micro-lenses/lenticulars such as, for example, those described in U.S. Pat. Nos. 5,500,765 and 6,069,650, as well as in U.S. Patent Application Nos. US2006/0202910, US2007/0008617, US2007/0008620, and PCT International Application WO2007/003792.

With regards to known prior art displays and display apparatuses, switching between 2D and 3D operation mode is generally accomplished by means of either electro-optical elements or by movable optical components. In either case, known prior art systems are only capable of switching between each of the two modes, and are incapable of changing operating characteristics within in each mode. Moreover, and with regards to displays that use movable optical components, the relative movement of the optical components is generally accomplished in only one direction; therefore, such systems have limited functional flexibility.

Accordingly, there still exists a need in the art for novel optical imaging systems and related 3D/2D image switchable apparatuses and systems (3D/2D displays) that are capable of changing operating characteristics within each mode, and that have high functional flexibility in a number of aspects and adaptability to various applications. The present invention fulfills these needs and provides for further related advantages.

SUMMARY OF THE INVENTION

A general object of the present invention is to provide a switchable optical imaging system and a 3D/2D image switchable apparatus having high functional flexibility in a number of aspects and adaptability to various applications to thereby solve many of the problems associated with the related art.

In brief, the present invention is based on generating directional optical beams, transforming these optical beams and projecting transformed optical beams in a field of view to thereby divide the field of view into one or more adjustable viewing zones and to form 2-dimensional (2D) images or perspective views of a 3-dimensional (3D) image of an object or scene therein. The present invention is embodied in the switchable optical imaging system and the 3D/2D image switchable apparatus using the same system.

The main idea of the invention involves the possibility of changing the direction and adjusting the divergency of transformed optical beams and is achieved by using matrices of converging micro-lenses with a displacement mechanism in a structure of the optical imaging system and providing the matrix or matrices movement relative to each other in axial and transversal directions. The matrix or matrices movement is performed in a number of ways, versions depending on an operation mode or its modification used and provides adaptability of the optical imaging system and the image switchable apparatus to various applications, as well as their functional flexibility in such aspects as switching operation modes or using some operation modes in combination, changing working parameters and adjusting operating characteristics in each operation mode, etc.

In a scanning operation mode the matrix or matrices horizontal movement is performed in a reciprocating fashion and thereby enables to divide the field of view into a plurality of adjustable viewing zones and to scan these viewing zones consistently with transformed optical beams in the field of view. The matrix or matrices movement in the axial direction changes angular sizes of zones and enables to provide a contiguity of adjacent viewing zones in the field of view. The plurality of viewing zones are intended for projecting therein either (i) corresponding perspective views of a particular 3D image in a 3D operation mode, or (ii) identical 2D images in a 2D scanning operation mode. Such operating characteristics as an angular size, direction and a number of viewing zones in the field of view, an angular size and depth of the field of view itself can be readily adjusted. It is possible to adjust also an angular resolution and a depth of the 3D image by changing the number of viewing zones. It should be noted that increasing the angular resolution does not reduce an image resolution in 3D and 2D scanning operation modes. It is preferable to have a wide field of view and high brightness of perspective views in such applications as advertising, whereas a high angular resolution of the 3D image—in some medical applications. A large number of perspective views should be used in these applications.

Actually, the number of viewing zones in the 3D operation mode is restricted only by the frame rate of the display component used in the structure of the image switchable apparatus. The higher the frame rate (the throughput) of the display component the more perspective views can be used for forming the 3D image with better quality. On the other hand, the higher the throughput of the display component the greater the angular size and depth of the field of view can be achieved by increasing the number of viewing zones. The wide and deep field of view is important in those applications where the same visual information should be provided simultaneously for more than one person.

When adjacent viewing zones are contiguous in the 3D operation mode, the better conditions of observing perspective views (without dark spaces or overlapping) are provided that improves visually perceiving the 3D image. Moreover, the 3D image is perceived as having full parallax if using matrices of spherical micro-lenses in the optical imaging system and arranging in addition their relative movement in a vertical direction.

When adjacent viewing zones are contiguous in the 2D scanning operation mode, the observer can see a particular 2D image without visually perceiving changes in image brightness if moving from one viewing zone to another as in the 3D operation mode and, what is important in the 2D mode, without any perspective distortion. Further, 2D images projected have the same resolution as perspective views of the particular 3D image that is limited essentially by the resolution of the display component used.

In a non-scanning operation mode the matrix or matrices movement in horizontal and axial directions is performed to select respectively a direction and angular size of a single adjustable viewing (observation) zone in the field of view. It is expedient in some special applications to provide observing 2D images projected in this zone by only one person, for example, for the purposes of confidentiality. Furthermore, the quality of each 2D image can be improved by increasing its dynamic range and retaining at the same time the highest level of its resolution. It is achieved by using the same display component (with the high throughput) as in the 3D or 2D scanning operation mode that provides an expanded range of image brightness (luminance) in each 2D image projected in the single viewing zone. This is very important in some medical applications.

Operation mode switching can be performed by changing the relative position of matrices in the axial direction to thereby set up the selected distances between matrices that relate to the scanning operation mode or the non-scanning operation mode. This can be made with the aid of drivers in a displacement mechanism of the optical imaging system that are controlled manually or by using a controller as in the image switchable apparatus. Apart from this, the controller enables quick switching also between 3D and 2D scanning operation modes while keeping the same high resolution of both the 3D and 2D images.

Another and more specific objects of the present invention can be achieved due to said functional flexibility and adaptability of the apparatus according to the invention, for example, when using operation modes in combination. Thus, the additional matrix or matrices reciprocating movement relative to each other in the axial direction allows improving quality of perspective views or identical 2D images projected in viewing zones of the field of view such that the observer sees the particular 3D or 2D image without blurring (distortions). This axial reciprocating movement is synchronized with the horizontal reciprocating movement of matrices.

On the other hand, it is possible to perform the 3D and 2D scanning operation mode simultaneously that allows observing the 3D image and selected 2D image at the same time and, moreover, with the same high image resolution. It is important to have such flexibility in some specific applications and can be accomplished by projecting a superposition of the corresponding perspective view and selected 2D image in each viewing zone.

Functional flexibility and adaptability of the optical imaging system and the image switchable apparatus becomes apparent also in such aspects as: eliminating or essentially reducing sensitivity to inaccuracy of the matrix or matrices movement in several ways; image scaling to thereby form a 3D image of a large size, if necessary; increasing a vertical divergency of optical beams for improving conditions of observing images having horizontal parallax; and selecting a color operation mode: a single-color operation mode with selected color or a multicolor operation mode.

According to first preferred and respective alternative embodiments of the present invention a switchable optical imaging system is configured for transforming optical beams emanating from a display surface displaying 2-dimensional patterns and for projecting transformed optical beams in a field of view to thereby divide the field of view into one or more adjustable viewing zones. The inventive optical imaging system comprises: a first matrix of converging micro-lenses, with each micro-lens being optically coupled to one respective area of the display surface along a respective optical axis; a second matrix of converging micro-lenses optically coupled to the micro-lenses of the first matrix; a third matrix of converging micro-lenses coaxially aligned and rigidly jointed (mounted) to the micro-lenses of the second matrix such that the second and third matrices in combination define a complex of matrices; and a displacement mechanism for axially moving the first matrix or the complex of matrices relative to each other and for transversely moving the first matrix or the complex of matrices relative to each other.

According to second preferred and respective alternative embodiments of the present invention a 3D/2D image switchable apparatus is configured for forming a plurality of perspective views of a 3-dimensional image and/or 2-dimensional images of an object or scene in a field of view in 3D and 2D operation modes respectively. The inventive image switchable apparatus comprises: a display component for generating 2-dimensional patterns, the display component having a data input for updating 2-dimensional patterns, a synchronization input, and a display surface displaying 2-dimensional patterns; a switchable optical imaging system for transforming optical beams emanating from the display surface and for projecting transformed optical beams in the field of view to thereby divide the field of view into one or more adjustable viewing zones, including: a first matrix of converging micro-lenses, with each micro-lens being optically coupled to one respective area of the display surface along a respective optical axis; a second matrix of converging micro-lenses optically coupled to the micro-lenses of the first matrix; a third matrix of converging micro-lenses coaxially aligned and rigidly jointed (mounted) to the micro-lenses of the second matrix such that the second and third matrices in combination define a complex of matrices; a displacement mechanism for axially moving the first matrix or the complex of matrices relative to each other and for transversely moving the first matrix or the complex of matrices relative to each other, the displacement mechanism having at least first and second control inputs; a sensor system for sensing the relative position of the first matrix and the complex of matrices in axial and transversal directions, the sensor system having at least first and second data outputs; and a controller for switching operation modes, controlling working parameters of the matrix or matrices movement in each operation mode and for synchronizing the generation of 2-dimensional patterns by the display component with the matrix or matrices movement, the controller having (i) at least first and second data inputs, the first and second data inputs of the controller are connected respectively to the first and second data output of the sensor system, (ii) a synchronization output being connected to the synchronization input of the display component, and (iii) at least first and second control outputs, the first and second control outputs of the controller are connected respectively to the first and second control inputs of the displacement mechanism.

These and other aspects of the present invention will become more evident upon reference to the following detailed description and attached drawings. It is to be understood, however, that various changes, alterations, and substitutions may be made to the specific embodiments disclosed herein without departing from their essential spirit and scope.

BRIEF DESCRIPTION OF THE DRAWINGS

The drawings are intended to be illustrative and symbolic representations of certain preferred and exemplary embodiments of the present invention and as such, they are not necessarily drawn to scale. Reference numerals and symbols are used to designate specific features that are schematically shown and described.

DETAILED DESCRIPTION OF THE PREFERRED EMBODIMENTS

The present invention is directed to several variants of a switchable optical imaging system and a related 3D/2D image switchable apparatus (3D/2D display) having high functional flexibility in a number of aspects and adaptability to various applications. Thus, the inventive optical imaging systems and related apparatuses disclosed herein are described and illustrated in terms of certain preferred embodiments—preferred embodiments that include various structural and optical arrangements that can be operated in various operation modes depending on the specific application. Among the various operation modes are several modifications of a scanning and a non-scanning operation mode. The functional flexibility and adaptability of the present invention include aspects such as, for example, the ability of switching operation modes or using some operation modes in combination, changing working parameters and adjusting operating characteristics in each operation mode, image scaling and adjusting image brightness, etc. Thus, and in accordance with the present invention, operating characteristics such as, for example, angular size, direction and a number of viewing zones in the field of view, depth of the field of view, as well as angular image resolution, depth of a 3D image and dynamic range of selected 2D images can be readily adjusted.

Figure 1A:
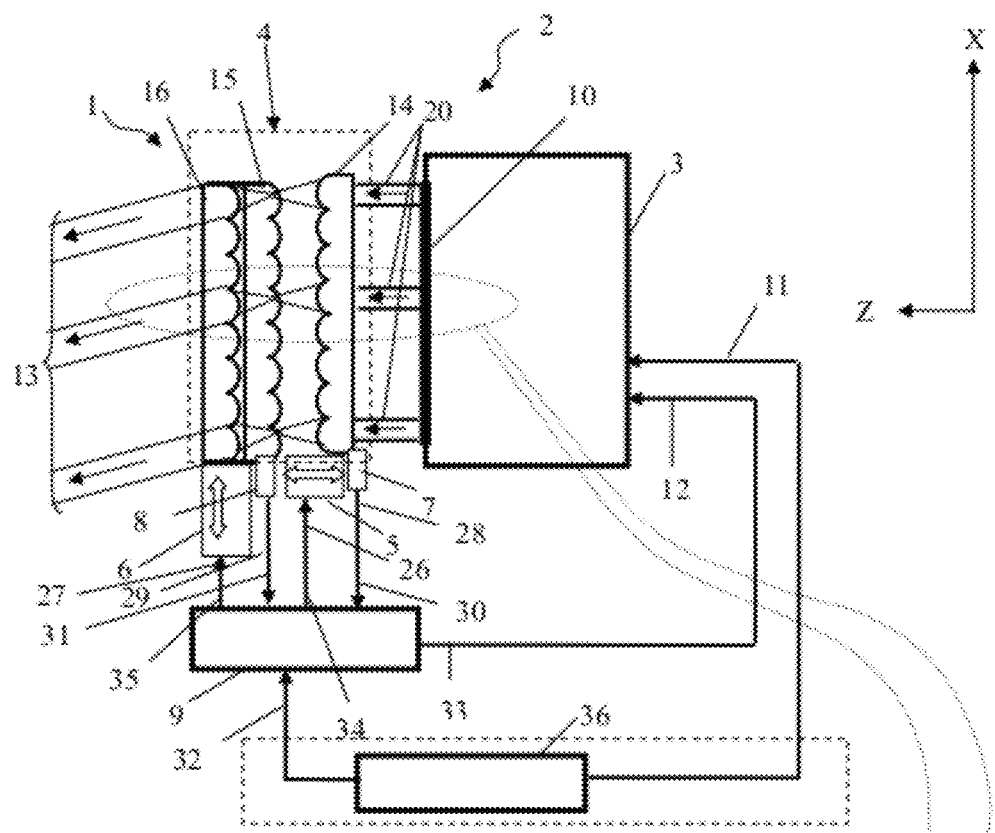
FIG. 1A is a general schematic representation of a switchable optical imaging system and 3D/2D image switchable apparatus in accordance with respective first and second preferred embodiments of the present invention. The schematic representation illustrates, among other things, the path traveled by representative optical beams emanating from respective areas of a display surface and transformed by the optical imaging system.
Figure 1B:
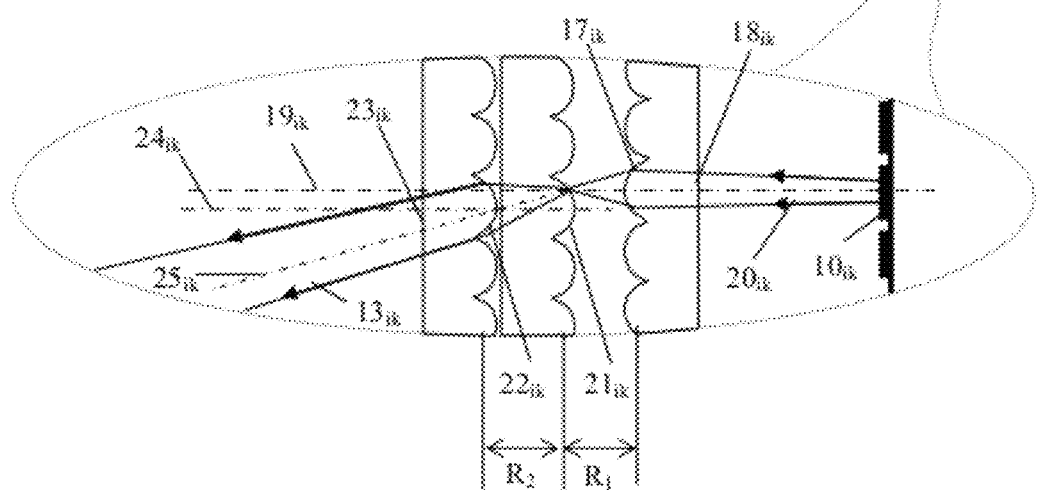
FIG. 1B is an enlarged view of a circled portion of FIG. 1A, and illustrates a relative position of matrices of converging micro-lenses and a display surface. The enlarged view illustrates the path traveled by a representative optical beam emanating from a respective area of the display surface and transformed by the optical imaging system.

Referring now to the drawings wherein like reference numerals designate identical or corresponding elements, and more particularly to FIGS. 1A-B, the present invention in accordance with respective first and second preferred embodiments comprises a switchable optical imaging system 1 and a related 3D/2D image switchable apparatus 2. The 3D/2D image switchable apparatus 2 (in conjunction with the optical imaging system 1) is intended to form a plurality of perspective views of a 3-dimensional (3D) image and/or 2-dimensional (2D) images of an object or scene in a field of view in 3D and 2D operation modes, respectively. As best shown in FIG. 1A, the inventive 3D/2D image switchable apparatus 2 includes a display component 3, the optical imaging system 1 (wherein the optical imaging system 1 further includes an optical matrix component 4 and a displacement mechanism (not designated within FIG. 1A for purposes of simplicity) that includes at least first and second drivers 5, 6), a sensor system (not designated within FIG. 1A for purposes of simplicity) that includes at least first and second position sensors 7, 8, and a controller 9. The display component 3 is for generating 2-dimensional patterns and has a display surface 10 that displays 2-dimensional patterns. The display component 3 is connected to a digital data input 11 for updating 2-dimensional patterns and a synchronization (control) input 12.

Figure 2:
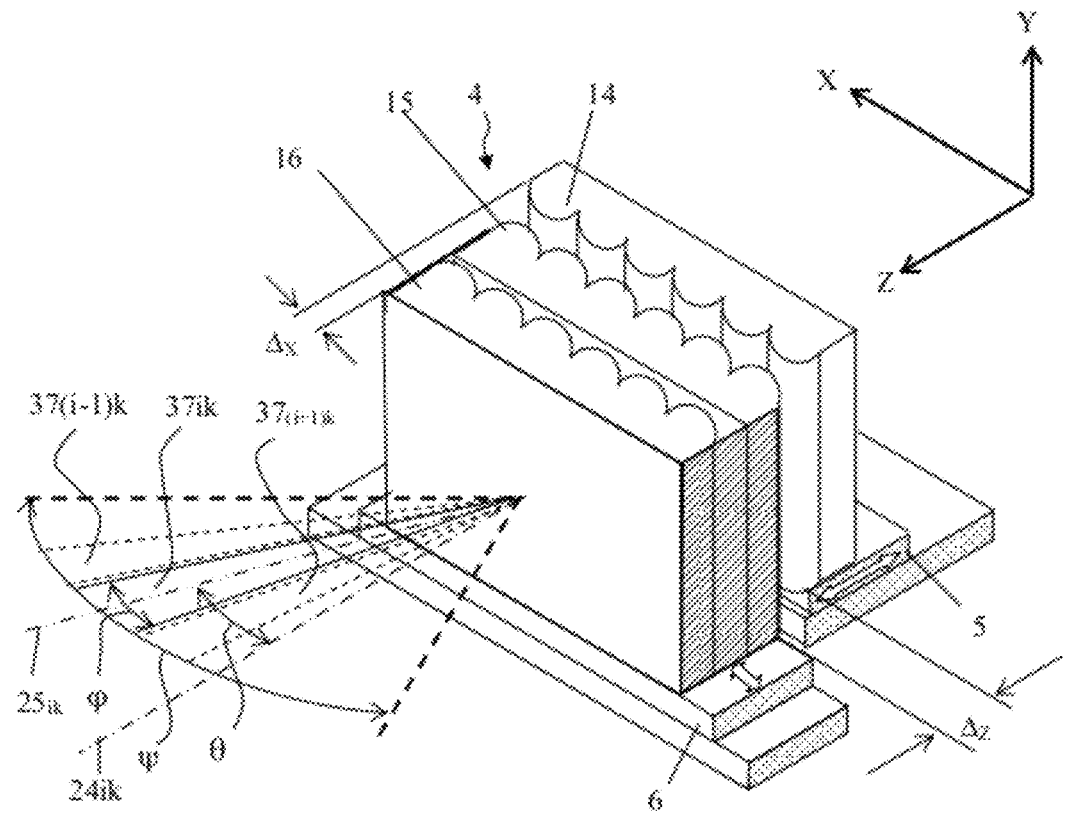
FIG. 2 is a three-dimensional schematic representation of the switchable optical imaging system and 3D/2D image switchable apparatus of FIG. 1A. The three-dimensional representation illustrates lenticular matrices of plano-convex micro-lenses oriented vertically, as well as the relative position of matrices in axial and transversal directions. The three-dimensional representation also illustrates adjacent viewing zones in a field of view.

The switchable optical imaging system 1 transforms optical beams 20 emanating from the display surface 10 of the display component 3 and projects the transformed optical beams 13 into a field of view to thereby divide the field of view into one or more adjustable viewing zones (some viewing zones are illustrated in FIG. 2). These functions are accomplished by the optical matrix component 4. As best shown in FIG. 1A, the optical matrix component 4 includes: a first matrix 14 of converging micro-lenses, a second matrix 15 of converging micro-lenses optically coupled to the micro-lenses of the first matrix 14, and a third matrix 16 of converging micro-lenses coaxially aligned and rigidly jointed to the micro-lenses of the second matrix 15 such that the second and third matrices 15, 16 in combination define a complex of matrices (wherein the complex of matrices is not designated itself in FIG. 1A for purposes of simplicity). The first, second, and third matrices 14, 15, 16 are illustrated in FIGS. 1A-B as respective first, second, and third matrices 14, 15, 16 of plano-convex micro-lenses.

The first matrix 14 and the complex of matrices 15, 16 are mounted respectively on the first and second drivers 5, 6 of the displacement mechanism. As shown in FIG. 1A, the first driver 5 is configured to axially move the first matrix 14 relative to the complex of matrices 15, 16 (i.e., along the Z-axis). Similarly, the second driver 6 is configured to horizontally move the complex of matrices 15, 16 relative to the first matrix 14 (i.e., along the X-axis). FIG. 1B further illustrates the relative position of matrices 14, 15, 16 of the optical matrix component 4 and the display surface 10 of the display component 3 in the image switchable apparatus 2.

More specifically, FIG. 1B illustrates a representative plano-convex micro-lens $17_{ik}$ of the first matrix 14 having a flat surface $18_{ik}$ facing toward the display surface 10 and being optically coupled to one respective area $10_{ik}$ of the display surface 10 along a respective optical axis $19_{ik}$ by means of emanating optical beam $20_{ik}$. Whereas the flat surfaces of micro-lenses $21_{ik}$ and $22_{ik}$ of the respective second and third matrices 15, 16 face away from the display surface 10 (for purposes of simplicity only a flat surface $23_{ik}$ of micro-lens $22_{ik}$ is designated in FIG. 1B). As shown, the micro-lenses $21_{ik}$, $22_{ik}$ of the respective second and third matrices 15, 16 are optically coupled, coaxially aligned and share a common optical axis $24_{ik}$ that is parallel to the optical axis $19_{ik}$ of the micro-lens $17_{ik}$ of the first matrix 14. As further shown, the micro-lens $17_{ik}$, $21_{ik}$ of the respective first and second matrices 14, 15 are optically coupled and spaced apart from each other a first selected distance, $R_1$. The micro-lenses $21_{ik}$, $22_{ik}$ of the respective second and third matrices 15, 16 are spaced apart from each other a second selected (predetermined) distance, $R_2$. Thus, and in this optical arrangement, FIG. 1B illustrates a path of the representative optical beam $20_{ik}$ emanating from one respective area $10_{ik}$ of the display surface 10 and being transformed by plano-convex micro-lenses $17_{ik}$, $21_{1k}$, $22_{ik}$ of the respective first, second, and third matrices 14, 15, 16 of the optical imaging system 1 into deflected and transformed optical beam $13_{ik}$ which is projected along axis $25_{ik}$ into the field of view.

In view of the foregoing and referring back to FIG. 1A, it is important to note that functional flexibility and adaptability of the optical imaging system 1 and the image switchable apparatus 2 are based on providing the matrix or matrices movement both in axial and transversal directions. In connection with several of the embodiments disclosed herein such movement is preferably applied equally. For example, and in the preferred embodiment shown in FIG. 1A (and relating both to the first and second preferred embodiments of the present invention), the first and second drivers 5, 6 of the displacement mechanism (not shown) are configured respectively to axially move the first matrix 14 relative to the complex of matrices 15, 16 and horizontally move the complex of matrices 15, 16 relative to the first matrix 14. The matrix or matrices movement can be performed in a number of ways depending on the selected operation mode.

In a scanning operation mode relating to a scanning mode embodiment of the present invention, the second driver 6 is further configured to perform the horizontal movement of the complex of matrices 15, 16 in a reciprocating fashion. This scanning operation mode enables the division of the field of view into a plurality of adjustable viewing zones such that these viewing zones can be scanned consistently with transformed optical beams 13 in the field of view. This scanning operation mode further enables adjacent viewing zones to be contiguous in the field of view if the first driver 5 is further configured in this operation mode to perform the axial movement of the first matrix 14 for adjusting a divergency of transformed optical beams 13. The plurality of viewing zones are intended for projecting therein either (i) corresponding perspective views of a particular 3D image in a 3D operation mode, or (ii) identical 2D images in a 2D scanning operation mode. When "adjacent viewing zones are contiguous" or, in other words, "contiguity of adjacent viewing zones is provided" (these terms are similar and equally used herein), an observer does not visually perceive changes in image brightness when moving from one viewing zone to another. Contiguity of adjacent viewing zones will be discussed hereinafter in more detail with reference to FIGS. 2, 3A-B.

In a non-scanning operation mode relating to a non-scanning mode embodiment of the present invention, a single adjustable viewing (observation) zone is used for projecting therein 2D images of particular interest. In this operation mode the second driver 6 is further configured to perform the horizontal movement of the complex of matrices 15, 16 (along the X-axis) for a third selected (predetermined) distance $\Delta_x$, whereas the first driver 5 is further configured to perform the axial movement of the first matrix 14 (along the Z-axis) for adjusting the divergency of transformed optical beams 13. It allows the single adjustable viewing zone to have a selected viewing direction and selected angular size in the field of view for the purposes of providing, for example, a required level of confidentiality in observing 2D images. The non-scanning operation mode will be discussed hereinafter in more detail with reference to FIGS. 6A-B, 7.

The operation modes can be switched manually (as in the optical imaging system 1 in accordance with the first preferred embodiment of the present invention) by changing the relative position of the first matrix 14 and the complex of matrices 15, 16 along the Z-axis. This will be discussed hereinafter in more detail with reference to FIGS. 6A-B. It is preferable, however, to switch operation modes with the aid of the controller 9. For switching operation modes or using operation modes in combination, controlling working parameters of the matrix or matrices movement and adjusting operating characteristics in each operation mode, the first and second drivers 5, 6 in the image switchable apparatus have respective control inputs 26, 27 being respective first and second control inputs of the displacement mechanism. The working parameters control of matrix or matrices movement is performed with the first and second position sensors 7, 8 of the sensor system that are intended for determining (sensing) the relative position of the first matrix 14 and the complex of matrices 15, 16 in axial and horizontal directions respectively. The first and second position sensors 7, 8 have respective data outputs 28, 29 being a respective first and second data outputs of the sensor system.

The controller 9 is generally intended for switching operation modes, controlling working parameters of the matrix or matrices movement in each operation mode and for synchronizing the generation of 2-dimensional patterns by the display component with the matrix or matrices movement. The controller 9 has at least first and second data inputs 30, 31, a synchronization output 33 and at least first and second control outputs 34, 35. The first and second data inputs 30, 31 of the controller 9 are connected to the respective data outputs 28, 29 of the first and second position sensors 7, 8 in the sensor system. The synchronization output 33 of the controller 9 is connected to the synchronization (control) input 12 of the display component 3. In addition, the first and second control outputs 34, 35 of the controller 9 are connected to respective control inputs 26, 27 of the drivers 5, 6 in the displacement mechanism.

A computer 36 is an auxiliary component of the 3D/2D image switchable apparatus 2 (in accordance with a second preferred embodiment of the present invention) and for this reason it is shown inside a box surrounded with a dashed line in FIG. 1A. The computer 36 can be used as a master controller for selecting or changing the operation mode or forming a new operation mode by generating and transmitting respective command signals to the controller 9 and for updating 2-dimensional patterns by transmitting data relating to new 2-dimensional patterns to the display component 3. To perform these functions the computer 36 has a control command output (not designated in FIG. 1A) and a data output (not designated in FIG. 1A) being connected to the data input 11 of the display component 3, whereas the controller 9 has further a control command input 32 being connected to the control command output of the computer 36.

In view of the foregoing and referring back to FIG. 1A, a switchable optical imaging system 1 (in accordance with a first preferred embodiment of the present invention) is intended for transforming optical beams 20 emanating from a display surface 10 displaying 2-dimensional patterns and for projecting transformed optical beams 13 in a field of view to thereby divide the field of view into one or more adjustable viewing zones (as shown in FIGS. 2, 3A-B, 6A-B, 7).

As best shown in FIGS. 1A-B, the optical imaging system 1 includes: a first matrix 14 of converging micro-lenses 17, with each micro-lens $17_{ik}$ being optically coupled to one respective area $10_{ik}$ of the display surface 10 along a respective optical axis $19_{ik}$; a second matrix 15 of converging micro-lenses 21 optically coupled to the micro-lenses 17 of the first matrix 14; a third matrix 16 of converging micro-lenses 22 coaxially aligned and rigidly jointed to the micro-lenses 21 of the second matrix 16 such that the second and third matrices 15, 16 in combination define a complex of matrices; and a displacement mechanism (not designated) for axially moving the first matrix 14 or the complex of matrices 15, 16 relative to each other and for transversely moving the first matrix 14 or the complex of matrices 15, 16 relative to each other.

In addition, and as previously described and best shown in FIG. 1A, the 3D/2D image switchable apparatus 2 using the switchable optical imaging system 1 is intended for forming a plurality of perspective views of a 3-dimensional image and/or 2-dimensional images of an object or scene in a field of view in 3D and 2D operation modes, respectively. The image switchable apparatus 2 includes: a display component 3 for generating 2-dimensional patterns, the display component 3 having a data input 11 for updating 2-dimensional patterns, a synchronization input 12, and a display surface 10 displaying 2-dimensional patterns; a switchable optical imaging system 1 for transforming optical beams 20 emanating from the display surface 10 and for projecting transformed optical beams 13 in a field of view to thereby divide the field of view into one or more adjustable viewing zones (as shown in FIGS. 2, 3A-B, 6A-B, 7), including: a first matrix 14 of converging micro-lenses 17, with each micro-lens $17_{ik}$ being optically coupled to one respective area $10_{ik}$ of the display surface 10 along a respective optical axis $19_{ik}$; a second matrix 15 of converging micro-lenses 21 optically coupled to the micro-lenses 17 of the first matrix 14; a third matrix 16 of converging micro-lenses 22 coaxially aligned and rigidly jointed (joined or connected) to the micro-lenses 21 of the second matrix 16 such that the second and third matrices 15, 16 in combination define a complex of matrices; a displacement mechanism (not designated) for axially moving the first matrix 14 or the complex of matrices 15, 16 relative to each other and for transversely moving the first matrix 14 or the complex of matrices 15, 16 relative to each other, the displacement mechanism having at least first and second control inputs 26, 27; a sensor system for sensing the relative position of the first matrix 14 and the complex of matrices 15, 16 in axial and transversal directions, the sensor system having at least first and second data outputs 28, 29; and a controller 9 for switching operation modes, controlling working parameters of the matrix or matrices movement in each operation mode and for synchronizing the generation of 2-dimensional patterns by the display component 3 with the matrix or matrices movement, the controller 9 having (i) at least first and second data inputs 30, 31, the first and second data inputs 30, 31 of the controller 9 are connected respectively to the first and second data output 28, 29 of the sensor system, (ii) a synchronization output 33 being connected to the synchronization input 12 of the display component 3, and (iii) at least first and second control outputs 34, 35, the first and second control outputs 34, 35 of the controller 9 are connected respectively to the first and second control inputs 26, 27 of the displacement mechanism.

As previously noted, the matrix or matrices movement in axial and transversal (e.g., horizontal) directions can be provided otherwise than in the preferable version shown in FIG. 1A. Thus, in one alternative version, the first matrix 14 is mounted on a combined driver (not shown in FIG. 1A) being a combination of the first and second drivers 5, 6 of the displacement mechanism (not shown) thereby forming a two-axis (X/Z) driver as is known in the art. In one alternative version the first and second drivers 5, 6 are respectively configured to move the first matrix 14 axially (along the Z-axis) and horizontally (along the X-axis) relative to the complex of matrices 15, 16. In one more alternative version, the complex of matrices 15, 16 is mounted on the combined driver being the combination of the first and second drivers 5, 6 of the displacement mechanism and forming the two-axis (X/Z) driver. In one more alternative version the first and second drivers 5, 6 are respectively configured to move the complex of matrices 15, 16 axially (along the Z-axis) and horizontally (along the X-axis) relative to the first matrix 14. In another alternative version the complex of matrices 15, 16 and the first matrix 14 are mounted respectively on the first and second drivers 5, 6 of the displacement mechanism. The first and second drivers 5, 6 are respectively configured to move axially (along the Z-axis) the complex of matrices 15, 16 relative to the first matrix 14 and move horizontally (along the X-axis) the first matrix 14 relative to the complex of matrices 15, 16.

In all alternative versions relating to both the optical imaging system 1 and the image switchable apparatus 2 (in accordance with respective alternative embodiments of the present invention) the matrix or matrices movement in the horizontal direction relative to each other can be performed in a reciprocating fashion. Like in the scanning operation mode relating to a preferable version, such a reciprocating movement enables to divide the field of view into a plurality of adjustable viewing zones and to scan these viewing zones consistently with transformed optical beams 13 in the field of view. Moreover, in all alternative versions like in the preferable version shown in FIG. 1A, the matrix or matrices movement in the axial direction relative to each other enables adjacent viewing zones to be contiguous in the field of view by adjusting a divergency of transformed optical beams 13.

Thus, when comparing the matrix or matrices movement performed in alternative and preferable versions, it will be apparent to those of ordinary skill in the art the importance of changing the relative position of the first matrix 14 and the complex of matrices 15, 16 with respect to each other in axial and transversal directions (but not which one of them, the first matrix 14 or the complex of matrices 15, 16, is actually moved). This circumstance is reflected in describing general functions of the displacement mechanism that is intended for axially moving the first matrix 14 or the complex of matrices 15, 16 relative to each other and for transversely moving the first matrix 14 or the complex of matrices 15, 16 relative to each other. To this reason, the importance of the alternative versions according to alternative embodiments of the present invention can be understood from the explanation of the preferable version. In other words, the preferable version relating both to the first and second preferred embodiments of the present invention is a representative version for alternative embodiments in the explanation of their essence and peculiarities. The latter also means that representative for alternative embodiments is also the explanation of scanning and non-scanning operation modes relating to the preferable version and, in particular, the explanation of contiguity of adjacent viewing zones discussed hereinafter with reference to FIGS. 2, 3A-B.

It is to be noted that functional flexibility and adaptability of the optical imaging system 1 and the image switchable apparatus 2 in many aspects are based on adjusting divergency of transformed optical beams 13 (see FIG. 1A). Thus, in both 3D and 2D scanning operation modes it allows providing contiguity of adjacent viewing zones in the field of view and thereby embodying the main idea of the invention in these modes. This aspect is now discussed herein with reference to FIG. 2, which illustrates a three-dimensional schematic representation of a specific structure of the optical imaging system 1. The optical matrix component 4 is represented in FIG. 2 by the first, second and third lenticular matrices 14, 15, 16 of plano-convex micro-lenses oriented vertically (along the Y-axis). And so, when the second driver 6 performs the horizontal movement of the complex of matrices 15, 16 (along the X-axis) relative to the first matrix 14 in the reciprocating fashion the plurality of adjustable viewing zones is disposed in the horizontal (XZ) plane. The adjacent viewing zones $37_{(i+1)k}$ (dotted lines) $37_{ik}$ (solid lines) and $37_{(i-1)k}$ (dotted lines) arranged in the X direction are shown in FIG. 2 as an example. The angular size of a representative viewing zone $37_{ik}$ can be adjusted by axially moving the first matrix 14 (along the Z-axis) relative to the complex of matrices 15, 16 with the aid of the first driver 5. The position of the first matrix 14 with a shift in an amount $\Delta_z$ corresponds to contiguity of adjacent viewing zones 37 and specifies an angular size $\phi$ of representative viewing zone $37_{ik}$. Whereas, the position of the complex of matrices 15, 16 with a shift in an amount $\Delta_x$ along the X-axis corresponds to an angle $\theta$ between the common optical axis $24_{ik}$ and the axis $25_{ik}$ of the transformed optical beam $13_{ik}$ (see FIG. 1B) and specifies a direction of representative viewing zone $37_{ik}$. Other adjustable viewing zones 37 have the same angular size $\phi$.

When contiguity of adjacent viewing zones 37 is provided, as shown in FIG. 2, the angular size $\psi$ of the field of view in the horizontal (XZ) plane is specified by the expression $\psi = N \phi$, where N is the number of viewing zones 37. For example, the angular size $\psi=30°$ can be provided for N=30 if $\phi=1°$. In 3D operation mode all these viewing zones 37 are scanned consistently with transformed optical beams 13 such that the plurality of perspective views of a particular 3D image are projected therein respectively. And so, an observer can see these perspective views without dark spaces or overlapping that means, in other words, without visually perceiving changes in image brightness when moving from one viewing zone to another. That enables the observer to see this particular 3D image of a better quality without distortion.

In addition, it should be noted that this 3D image has only horizontal parallax for this specific structure of the optical matrix component 4. The observer can visually perceive 3D image observed as having full parallax when using matrices 14, 15, 16 of spherical micro-lenses in the optical imaging system 1 instead of lenticular matrices 14, 15, 16 shown in FIG. 2. For this particular structure of the optical matrix component 4, contiguity of adjacent viewing zones can be provided in both transversal directions (i.e., along the X-axis and Y-axis) by axially moving the first matrix of spherical micro-lenses 14 (along the Z-axis) relative to the complex of matrices of spherical micro-lenses 15, 16 with the aid of the first driver 5 just as described herein above with reference to FIG. 1A. A scanning procedure for this particular structure of the optical matrix component 4 requires the displacement mechanism to have a third driver (not shown in FIG. 1A) configured to vertically move (i) the first matrix of spherical micro-lenses 14 relative to the complex of matrices of spherical micro-lenses 15, 16, or (ii) the complex of matrices of spherical micro-lenses 15, 16 relative to the first matrix of spherical micro-lenses 14. Like the first and second drivers 5, 6 described herein above, the third driver has a control input being a third control input of the displacement mechanism. The scanning procedure of viewing zones in the field of view can be arranged in horizontal and vertical directions using any way known in the art. In this procedure the second driver 6 performs the horizontal movement of the complex of matrices 15, 16 in a reciprocating fashion to provide horizontal scanning, whereas the third driver performs the vertical movement of the first matrix 14 to provide vertical scanning. Controller 9 has a third control output connected to the third control input of the displacement mechanism and is configured to control the third driver performance and synchronize additionally the vertical movement of, for example, the first matrix 14 with the horizontal reciprocating movement of the complex of matrices 15, 16.

Figure 3A:
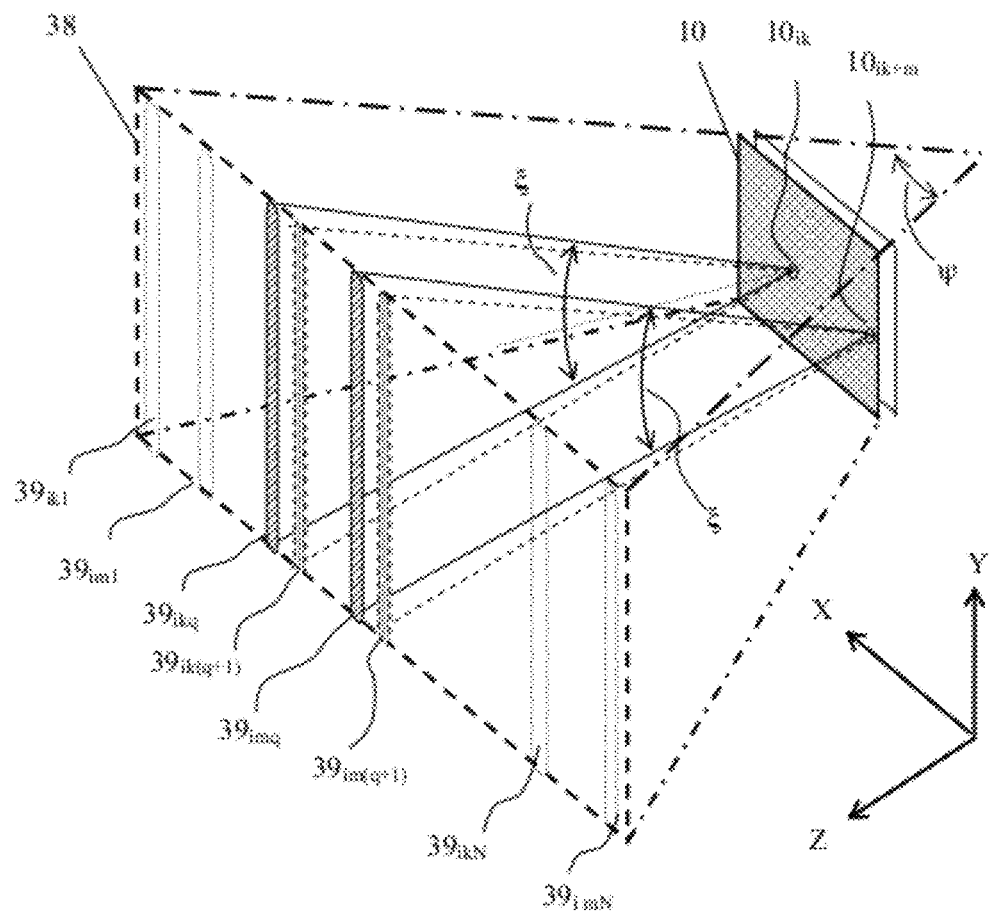
FIG. 3A is a three-dimensional illustration of representative optical beams emanating from two respective discrete areas of the display surface and projected by the optical imaging system of FIG. 1A into a field of view represented graphically by its cross-section, wherein the field of view in a scanning operation mode is divided into a plurality of adjustable viewing zones that are separated from one another by a gap when a divergency of optical beams is relatively small.
Figure 3B:
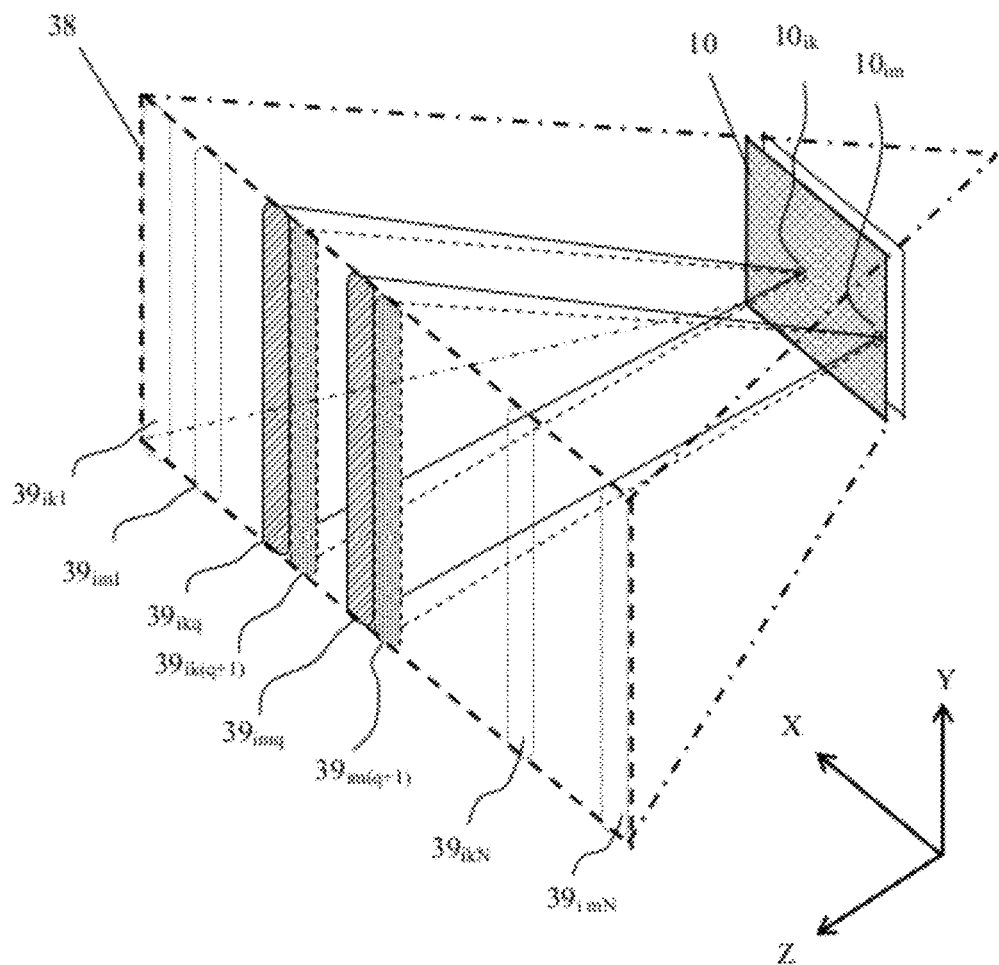
FIG. 3B is a three-dimensional illustration of representative optical beams emanating from two respective areas of the display surface and projected by the optical imaging system of FIG. 1A into a field of view represented graphically by its cross-section, wherein the field of view in a scanning operation mode is divided into a plurality of adjustable viewing zones such that adjacent viewing zones are contiguous with one another due to adjusting a divergency of optical beams.

Peculiarities of the scanning mode embodiment of the present invention in the aspect of contiguity of adjacent viewing zones are further described with reference to FIG. 3A-B. Each of them is a three-dimensional illustration of representative optical beams (not designated) emanating from two respective areas $10_{ik}$ and $10_{im}$ of the display surface 10 and projected by the optical imaging system 1 of FIG. 1A into the field of view. The field of view is represented graphically by its rectangular cross-section 38 (dashed line) at a specified distance from display surface 10 and has its angular size $\psi$ in the horizontal (XZ) plane. In the scanning operation mode (for example, in the 3D operation mode) the field of view is divided into a plurality of adjustable viewing zones for projecting perspective views of the 3D image therein. Said representative optical beams have small horizontal divergency (not designated) in the XZ plane and increased vertical divergency with an angle $\xi$ (along the Y-axis) for enlarging vertical size of the field of view that will be discussed hereinafter with reference to FIG. 10A-B. And so, as shown in FIG. 3A-B, the projections (e.g., $39_{ikq}$, $39_{imq}$) of said representative optical beams from areas $10_{ik}$ and $10_{im}$ onto the cross-section 38 are vertically elongated for various perspective views. For these projections $39_{ikg}$, $39_{imq}$ the position of the respective area is designated by row number i (i=1 ... n) and by column number k (k=1 ... m) on the display surface 10, whereas q is number of the particular perspective view (q=1 ... N). Thus, the observer can see a gap between adjacent perspective views (corresponding adjustable viewing zones 37) that is represented by a gap between projections $39_{ikg}$ and $39_{ikg+1}$ or $39_{imq}$ and $39_{imq+1}$ shown in FIG. 3A, when a divergency of optical beams in the XZ plane is relatively small. By properly adjusting the divergency of optical beams 13 as described herein above with reference to FIG. 1A said contiguity of adjacent perspective views (corresponding adjustable viewing zones 37) is provided as illustrated in FIG. 3B for the same optical beam projections $39_{ikg}$ and $39_{ikg+1}$ or $39_{imq}$ and $39_{imq+1}$.

In the 2D scanning operation mode in accordance with the scanning mode embodiment of the present invention an identical 2D image is projected in each viewing zone 37. When contiguity of adjacent viewing zones 37 is provided, the observer can see a particular 2D image without visually perceiving changes in image brightness if moving from one viewing zone to another as in the 3D operation mode and, what is important in the 2D mode, without any perspective distortion. Moreover, a resolution in projected 2D images has the same level as in perspective views of the particular 3D image and is limited essentially by the resolution of the display component 3 used.

It is to be noted further that functional flexibility and adaptability of the optical imaging system 1 and image switchable apparatus 2 in some aspects are based also on changing the number of adjustable viewing zones 37. The greater a depth of the object or scene the more number of adjustable viewing zones 37 (or perspective views in 3D operation mode) should be used in the field of view to reproduce its spatial peculiarities. On the other hand, when increasing the number of adjustable viewing zones 37 and keeping adjacent viewing zones contiguous in the specified angular size ψ of the field of view, an angular size φ of each viewing zone 37 is reduced, i.e., an angular resolution becomes higher. And so, it is possible to adjust the depth of 3D images and the angular resolution by changing the number of adjustable viewing zones 37. The depth and angular size ψ of the field of view can be adjusted in a similar way depending on various applications. It should be noted that increasing the angular resolution does not reduce an image resolution in 3D and 2D scanning operation modes.

Thus, it is important in some applications (e.g., in medical applications) to form 3D images with the high angular resolution. The high image brightness and the wide field of view are preferable in such applications as advertising. The wide and/or deep field of view is necessary in those applications where the same visual information should be provided simultaneously for more than one person. A large number of perspective views should be used in these applications.

Furthermore, the number of adjustable viewing zones 37 (or perspective views in 3D operation mode) N is ultimately limited by a frame rate R of the display component 3 to be used in the image switchable apparatus 2 in accordance with the second preferred embodiment of the present invention. The frame rate R should meet the requirement R>N f, where f—is the critical frequency of the eye (usually about or more than 30 Hz). Therefore, the higher the frame rate R (meaning the higher throughput of display component 3) the more perspective views can be used for forming the 3D image with better quality. On the other hand, the higher the throughput of the display component 3 used in 3D operation mode the greater the angular size and depth of the field of view can be achieved by increasing the number of perspective views.

In the scanning operation modes relating to any version (preferable or alternative) of the image switchable apparatus 2 described herein above (according to the second preferred embodiment or alternative embodiments of the present invention), a generation of 2-dimensional patterns by the display component 3 should be synchronized with the matrix or matrices movement or, stated otherwise, with a procedure of scanning the plurality of viewing zones 37 such that each perspective view of the particular 3D image in the 3D operation mode or the identical 2D image in the 2D scanning operation mode is projected in the respective viewing zone 37. In each of said versions such synchronization is performed by the controller 9 (see FIG. 1A). For example, in the preferable version, the controller 9 synchronizes moments of displaying 2-dimensional patterns on the display surface 10 of the display component 3 with the corresponding position of the complex of matrices 15, 16 relative to the first matrix 14 in horizontal direction (along the axis X). Signals from data outputs 28, 29 of the first and second position sensors 7, 8 are used by controller 9 for said synchronization. The controller 9 is also used for switching operation modes.

One more aspect of functional flexibility and adaptability of the image switchable apparatus 2 (in accordance with the scanning mode embodiment of the present invention) is associated with using operation modes in combination to meet requirements in some specific applications. Thus, in one modification of the scanning operation mode relating to the preferable version of the image switchable apparatus 2 (shown in FIG. 1A), the second driver 6 is further configured to perform the horizontal (along the X-axis) reciprocating movement of the complex of matrices 15, 16 relative to a first selected position (e.g., the position X=0) where micro-lenses of the second matrix 15 are coaxially aligned with micro-lenses of the first matrix 14. Whereas, the first driver 5 is further configured to perform the axial movement of the first matrix 14 (along the Z-axis) in a reciprocating fashion relatively a second selected (predetermined) position $Z_0$ where adjacent viewing zones 37 being contiguous in the field of view. The controller 9 is configured to control performance of the first and second drivers 5, 6 and to synchronize additionally the axial reciprocating movement of the first matrix 14 with the horizontal reciprocating movement of the complex of matrices 15, 16 as shown in FIG. 4A-B.

Figure 4A:
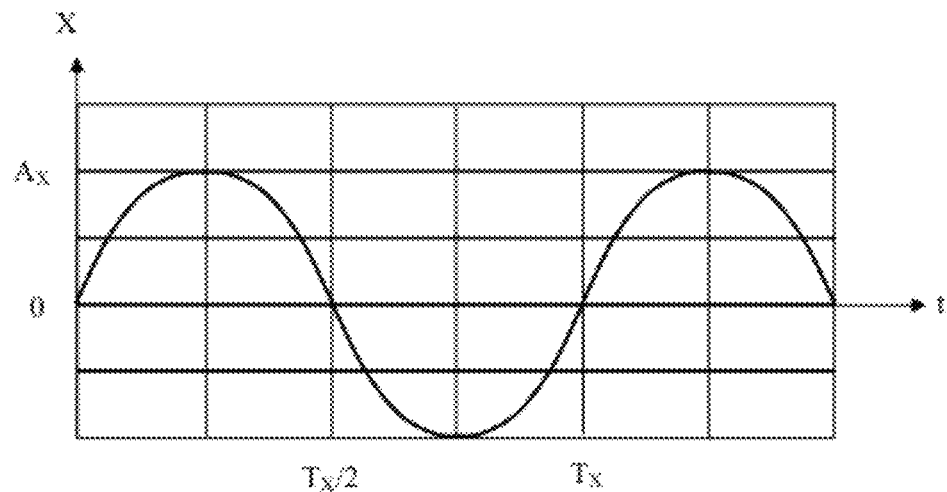
FIG. 4A is a time diagram of a horizontal reciprocating movement of the complex of matrices shown in FIG. 2 (i.e., movement along the X-axis) over a selected time period in one modification of a scanning operation mode of the image switchable apparatus according to the second preferred embodiment of the present invention.
Figure 4B:
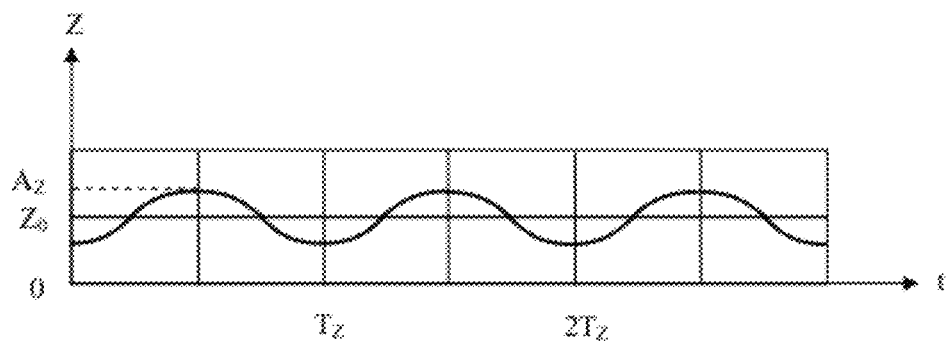
FIG. 4B is a time diagram of an axial reciprocating movement of the first matrix shown in FIG. 2 (i.e., movement along Z-axis) over a selected time period in one modification of a scanning operation mode of the image switchable apparatus according to the second preferred embodiment of the present invention, wherein the axial reciprocating movement is synchronized with the horizontal reciprocating movement illustrated in FIG. 4A.

Thus, a time diagram of the horizontal movement of the complex of matrices 15, 16 is illustrated in FIG. 4A over a selected time period. Amplitude $A_x$ and a period $T_x$ are working parameters of this horizontal movement. The controller 9 is configured to adjust the peak-to-peak amplitude $A_x$ such that it is preferably restricted by an aperture of micro-lenses of the respective matrix (the second matrix 15 in this version). Actually, this restriction can be applied to any alternative version as well. A time diagram of the axial movement of the first matrix 14 with a period $T_z=T_x/2$ and amplitude $A_z$ as working parameters is illustrated in FIG. 4B over the same selected time period. Amplitude $A_z$ of the axial movement is further adjusted by the controller 9 such that it is determined by a curvature radius of micro-lenses of the second matrix 15.

This modification allows improving quality of perspective views or identical 2D images projected in adjustable viewing zones 37 with respect to versions described herein above. This is explained by reducing the change in optical paths between the first matrix 14 and the complex of matrices 15, 16 during their horizontal reciprocating movement relative to each other.

The same results can be obtained in other modifications of the scanning operation mode relating to another alternative version of the image switchable apparatus 2. In this modification the second driver 6 is configured to perform the horizontal reciprocating movement of the first matrix 14 relatively the first selected position, whereas the first driver 5 is configured to perform the axial reciprocating movement of the complex of matrices 15, 16 relatively the second selected position $Z_0$.

It is important in some specific applications to observe at the same time a 3D image and a 2D image. This is possible in the scanning operation mode relating to the preferable or alternative version of the image switchable apparatus 2 by carrying out the 3D operation mode and 2D scanning operation mode simultaneously. In this particular scanning mode embodiment of the present invention, the second driver 6 is configured to perform the matrix or matrices horizontal movement in a reciprocating fashion such that a plurality of adjustable viewing zones 37 is scanned consistently with transformed optical beams 13 in the field of view. Whereas, the controller 9 is configured to control the second driver 6 performance and synchronize a sequence of 2-dimensional patterns generated by the display component 3 with the matrix or matrices horizontal movement such that each 2-dimensional pattern to be projected in one of viewing zones 37 contains a superposition of the corresponding perspective view and selected 2D image. The peculiarity of using 3D and 2D scanning operation modes in combination is the fact that both the 3D image and selected 2D image have the same high image resolution.

In the scanning operation mode (or its modifications) relating to preferable or alternative versions of the optical imaging system 1 and image switchable apparatus 2 described herein above, the first matrix 14 or the complex of matrices 15, 16 is moved in the axial direction (along the Z-axis) relative to each other for a selected distance and held in (or performed the axial reciprocating movement relatively) a selected position providing contiguity of adjacent viewing zones in the field of view. This result can be achieved in a variety of optical arrangements of matrices 14, 15, 16 of micro-lenses that turns out to be another aspect of functional flexibility and adaptability of the optical imaging system 1 and the image switchable apparatus 2. The schematic representations of some optical arrangements of matrices 14, 15, 16 according to the scanning mode embodiment of the present invention are illustrated in FIGS. 5A, B, C, wherein micro-lenses of the first matrix 14 have a first focal length, $F_1$, and micro-lenses of the second matrix 15 have a second focal length, $F_2$.

Figure 5A:
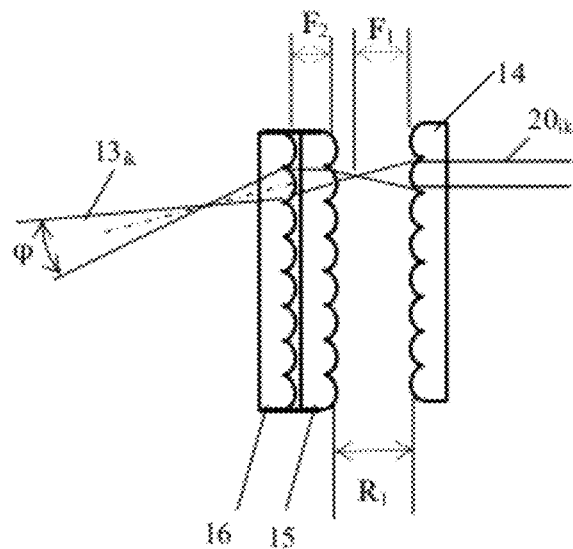
FIG. 5A is a schematic representation of one optical arrangement of matrices of micro-lenses in the optical imaging system according to a scanning mode embodiment of the present invention, wherein a third matrix is located within a back focal area of micro-lenses of a second matrix, and wherein the second matrix is spaced apart from a first matrix a first selected distance, $R_1$, such that $F_1<R_1<2F_1$ and such that adjacent viewing zones are contiguous with one another in the field of view.
Figure 5B:
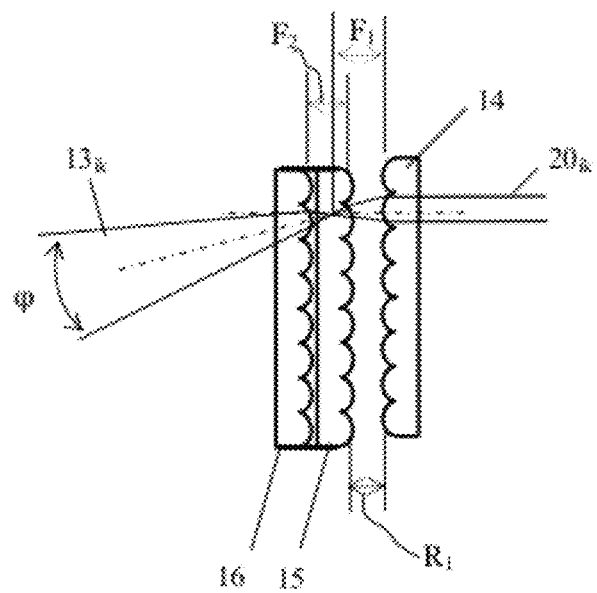
FIG. 5B is a schematic representation of another optical arrangement of matrices of micro-lenses in the optical imaging system according to a scanning mode embodiment of the present invention, wherein a third matrix is located within a back focal area of micro-lenses of a second matrix, and wherein the second matrix is spaced apart from a first matrix a first selected distance, $R_1$, such that $(F_1-F_2)<R_1<F_1$ and such that adjacent viewing zones are contiguous with one another in the field of view.

Thus, in one optical arrangement as shown in FIG. 5A, the second matrix 15 is spaced apart from the first matrix 14 a first selected distance, $R_1$, such that $F_1 < R_1 < 2F_1$, and the third matrix 16 is spaced apart from the second matrix 15 a second selected distance, $R_2$, and located within a back focal area of micro-lenses of the second matrix 15. In one more optical arrangement as shown in FIG. 5B, the second matrix 15 is spaced apart from the first matrix 14 a first selected distance, $R_1$, such that $(F_1-F_2) < R_1 < F_1$, and the third matrix 16 is spaced apart from the second matrix 15 a second selected distance, $R_2$, and located within a back focal area of micro-lenses of the second matrix 15.

Figure 5C:
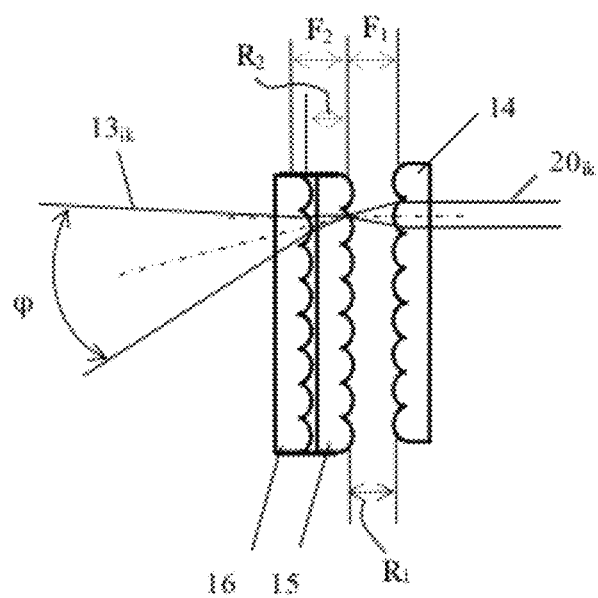
FIG. 5C is a schematic representation of yet another optical arrangement of matrices of micro-lenses in the optical imaging system according to a scanning mode embodiment of the present invention, wherein a second matrix is located within a back focal area of micro-lenses of a first matrix, and wherein a third matrix is spaced apart from the second matrix a second selected distances, $R_2$, such that $R_2<F_2$ and such that adjacent viewing zones are contiguous with one another in the field of view.

Whereas, in another optical arrangement shown in FIG. 5C, the second matrix 15 is spaced apart from the first matrix 14 a first selected distance, $R_1$, and located within a back focal area of micro-lenses of the first matrix 14, and the third matrix 16 is spaced apart from the second matrix 15 a second selected distances, $R_2$, such that $R_2 < F_2$.

Operating characteristics of the optical imaging system 1 and image switchable apparatus 2 do not change significantly if, in the corresponding optical arrangement, the second matrix 15 is out of the focal plane (but inside the back focal area) of micro-lenses of the first matrix 14. On the other hand, it enables to eliminate or essentially reduce the sensitivity of the optical imaging system 1 and image switchable apparatus 2 to inaccuracy of the matrix or matrices movement. Furthermore, the reduction in sensitivity can be achieved by using first, second and third matrices 14, 15, 16 of micro-lenses with different focal lengths. The similar results can be also achieved by using matrices with flat substrates. Thus, the first, second and third matrices 14, 15, 16 of plano-convex micro-lenses may have respective first, second, and third substrates, each substrate being a flat transparent plate having an optical contact with the flat surfaces of micro-lenses of the respective matrix (see FIG. 8A for more detail).

Figure 6A:
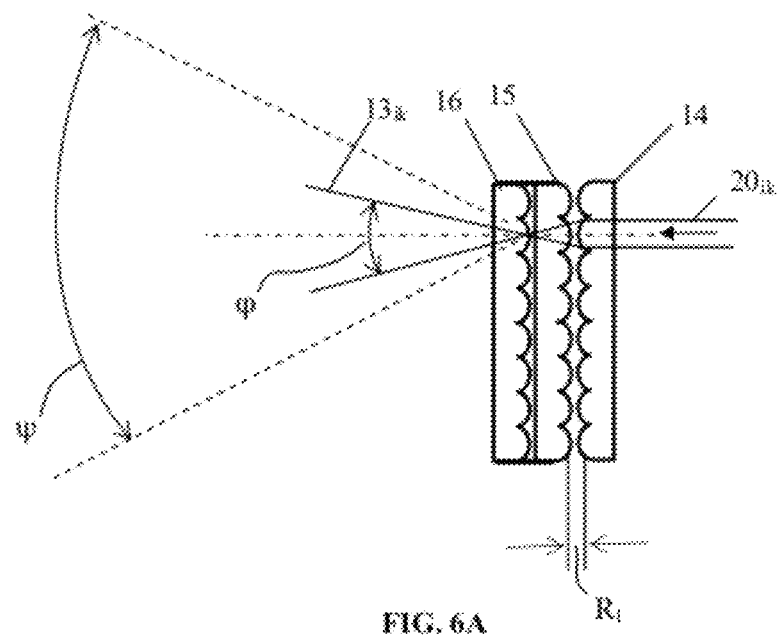
FIG. 6A is a schematic representation of one optical arrangement of matrices of micro-lenses in the optical imaging system according to a non-scanning mode embodiment of the present invention, wherein a second matrix is spaced apart from a first matrix a first selected distance, $R_1$, such that $0<R_1<F_1$ and such that a single adjustable viewing zone has a selected angular size $\phi$ in the field of view (angular size $\psi$) due to adjusting a divergency of transformed optical beams.
Figure 6B:
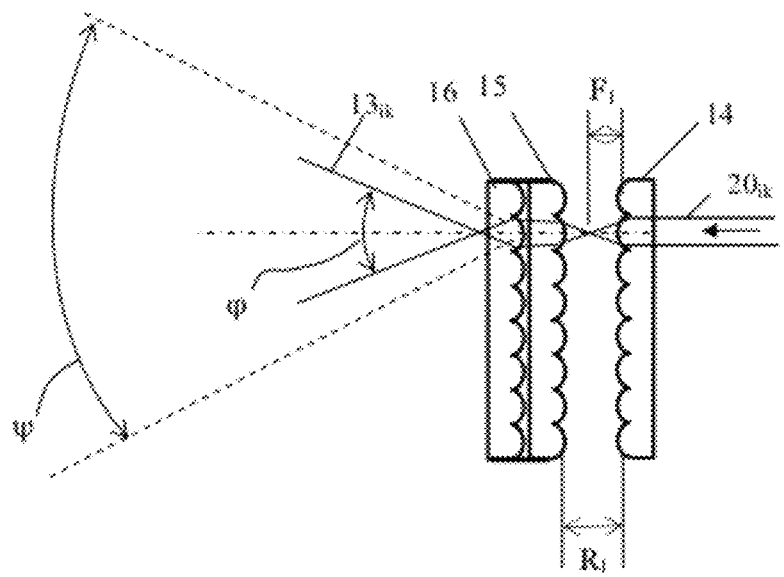
FIG. 6B is a schematic representation of another optical arrangement of matrices of micro-lenses in the optical imaging system according to a non-scanning mode embodiment of the present invention, wherein a second matrix is spaced apart from a first matrix a first selected distance, $R_1$, such that $F_1<R_1\leq 2F_1$ and such that a single adjustable viewing zone has a selected angular size $\phi$ in the field of view (angular size $\psi$) due to adjusting a divergency of transformed optical beams.
Figure 7:
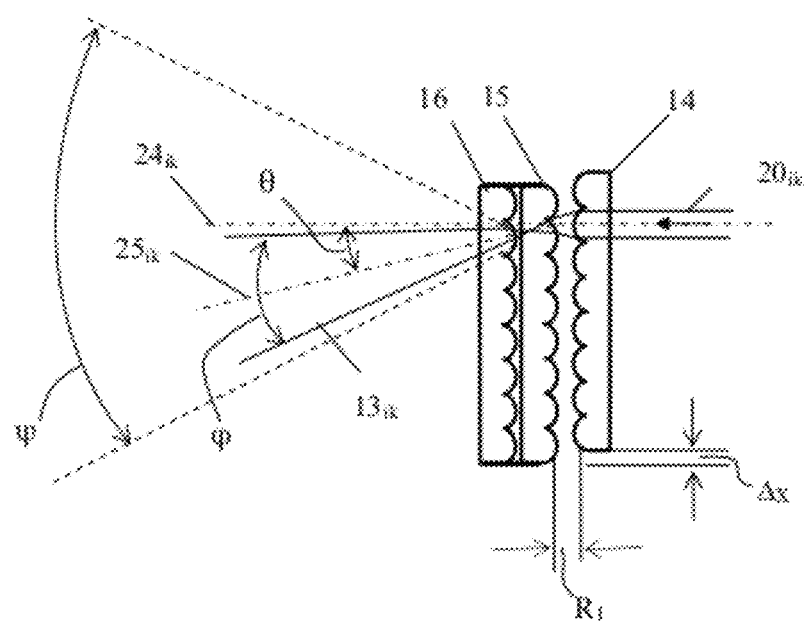
FIG. 7 is a schematic representation of a specific optical arrangement of matrices of micro-lenses in the optical imaging system according to a non-scanning mode embodiment of the present invention, wherein a complex of matrices is horizontally shifted (along the X-axis) a third selected distance, $\Delta_x$, such that a single adjustable viewing zone has a selected viewing direction (angle $\theta$) in the field of view (angular size $\psi$) due to adjusting a direction of transformed optical beams

In a non-scanning operation mode the optical imaging system 1 is intended for selecting a viewing direction and angular size of a single adjustable viewing zone in the field of view and for projecting 2D images of interest therein. Similar to the scanning operation mode discussed in detail herein above, such a selection can be achieved in some optical arrangements of matrices of micro-lenses. For instance, FIGS. 6A-B, 7 represent schematically some optical arrangements of matrices of converging micro-lenses in the optical imaging system 1 and image switchable apparatus 2 in accordance with a non-scanning mode embodiment of the present invention. As shown, the first matrix 14 or the complex of matrices 15, 16 is moved in the axial direction (along the Z-axis) relative to each other for adjusting a divergency of transformed optical beams 13 such that the single adjustable viewing zone has a selected angular size $\phi$ in the field of view (angular size $\psi$). On the other side, as shown in FIG. 7, the complex of matrices 15, 16 or the first matrix 14 is moved in the horizontal direction (along the X-axis) relative to each other a third selected distance $\Delta_x$ for adjusting a direction of transformed optical beams 13 such that the single adjustable viewing (observation) zone has a selected viewing direction (specified by an angle $\theta$) in the field of view (angular size $\psi$). It is expedient in some special applications to select the angular size $\phi$ and viewing direction (angle $\theta$) of the viewing (observation) zone in 2D non-scanning operation mode in such a manner so as to provide a required level of confidentiality of observing 2D images of interest.

In the optical arrangements of FIGS. 6A-B, micro-lenses of the first matrix 14 have a first focal length, $F_1$, and micro-lenses of the second matrix 15 have a second focal length, $F_2$. The complex of matrices 15, 16 is held in a selected position relative to the first matrix 14 in the horizontal direction, for example, in the position where micro-lenses of the second matrix 15 is coaxially aligned with micro-lenses of the first matrix 14 (X=0).

In addition, in one optical arrangement shown in FIG. 6A, the second matrix 15 is spaced apart from the first matrix 14 a first selected distance, $R_1$, such that $0 < R_1 < F_1$.

In one more optical arrangement shown in FIG. 6B, the second matrix 15 is spaced apart from the first matrix 14 a first selected distance, $R_1$, such that $F_1 < R_1 < 2F_1$.

As illustration to the non-scanning operation mode in FIGS. 6A-B, 7, the representative optical beam $20_{ik}$ is shown to be transformed by matrices 14, 15, 16 into the optical beam $13_{ik}$ that is projected into the field of view along a common optical axis (not designated) of their micro-lenses as in FIGS. 6A-B or along a deflected optical axis $25_{ik}$ at the angle $\theta$ to the common optical axis $24_{ik}$ of micro-lenses of the complex of matrices 15, 16.

The selected angular size $\phi$ and viewing direction (angle $\theta$) of the viewing zone can be provided with the aid of the first and second drivers 5, 6 controlled manually as in the optical imaging system 1 in accordance with the first preferred embodiment of the present invention or with the aid of controller 9 as in the image switchable apparatus 2 in accordance with the second preferred embodiment of the present invention. To carry out the functional flexibility and adaptability of the image switchable apparatus 2 in the aspect of adjusting the size $\phi$ and viewing direction (angle $\theta$) of the single viewing zone, the controller 9 is configured to control the first and second drivers 5, 6 performances.

It is important that in the non-scanning operation mode the quality of a 2D image can be improved by increasing its dynamic range and retaining at the same time the highest level of its resolution. This resolution is determined essentially by the resolution of the display component 3 used. In particular, the improvement is implemented by using the same display component 3 (with the high throughput) as in the 3D operation mode or 2D scanning operation mode that provides an expanded range of image brightness (luminance) in each 2-dimensional pattern projected in the single viewing zone.

It is of particular interest to note that the essence and peculiarities of the preferred and alternative embodiments of the present invention disclosed herein in more detail do not depend on the kind of converging micro-lenses that are used in said optical matrix component 4 of the optical imaging system 1. The first, second, and third matrices 14, 15, 16 of converging micro-lenses can be respective first, second, and third matrices of plano-convex micro-lenses that have respective the first, second, and third pitches between their micro-lenses wherein the first, second, and third pitches are the same. These matrices 14, 15, 16 can be the respective first, second, and third lenticular matrices having their cylindrical micro-lenses oriented vertically when horizontal parallax seems to be enough for observing the particular 3D image as described herein above with reference to FIG. 2. In addition, the matrices 14, 15, 16 may be respective first, second, and third matrices of spherical micro-lenses when visually perceiving 3D image observed as having full parallax is of specific interest. Each of matrices 14, 15 and 16 can also be made as a matrix of concave or lenticular micro-lenses. Further, the micro-lenses of the first, second and third matrices 14, 15, 16 have respective first, second, and third focal lengths, and usually the first, second, and third focal lengths are the same. On the other hand, the first, second, and third focal lengths can be different if, for example, the reduction in sensitivity of the optical imaging system 1 and image switchable apparatus 2 to the inaccuracy of the matrix or matrices movement is necessary, as was described herein above.

Figure 8A:
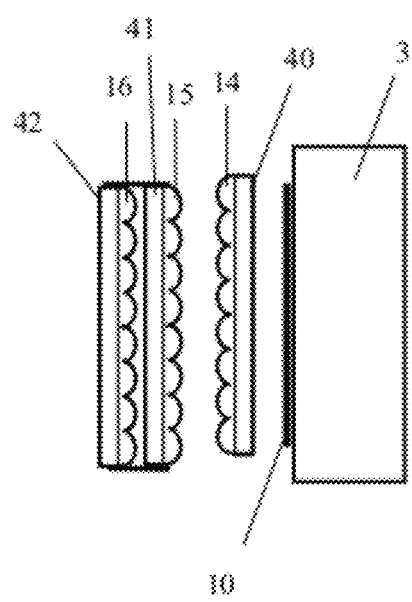
FIG. 8A is a schematic representation of one particular optical arrangement of matrices of plano-convex micro-lenses and the display surface in the optical imaging system according to another embodiment of the present invention, wherein the flat surfaces of micro-lenses of the first matrix face toward the display surface, whereas the flat surfaces of micro-lenses of the second and third matrices face away from the display surface, and wherein the first, second, and third matrices include respective first, second, and third substrates.
Figure 8B:
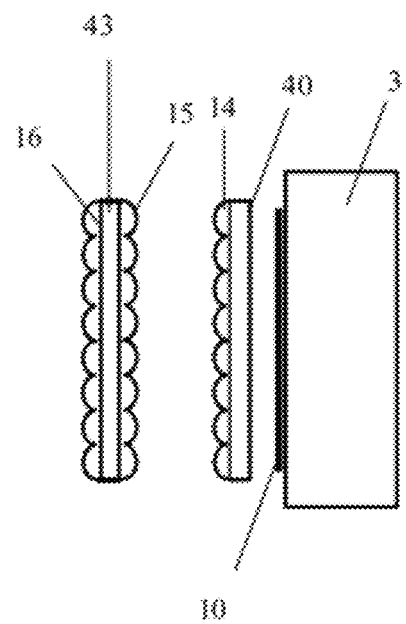
FIG. 8B is a schematic representation of another particular optical arrangement of matrices of plano-convex micro-lenses and the display surface in the optical imaging system according to yet another embodiment of the present invention, wherein the flat surfaces of micro-lenses of the first and third matrices face toward the display surface, whereas the flat surfaces of micro-lenses of the second matrix face away from the display surface, and wherein the first matrix includes a first substrate, whereas the second and third matrices include a shared common substrate.

The first, second and third matrices 14, 15, 16 of plano-convex micro-lenses may have respective first, second, and third substrates 40, 41, 42, with each substrate being a flat transparent plate having an optical contact with flat surfaces of micro-lenses of the respective matrix (see FIG. 8A). In FIG. 8A, the flat surfaces of micro-lenses of the first matrix 14 face toward the display surface 10 of the display component 3, whereas the flat surfaces of micro-lenses of the second and third matrices 15, 16 face away from the display surface 10. On the other hand, as shown in FIG. 8B, the flat surfaces of micro-lenses of the first and third matrices 14, 16 can be faced toward the display surface 10, whereas the flat surfaces of micro-lenses of the second matrix 15 face away from the display surface 10. It is preferable in this regard that the second and third matrices 15, 16 of plano-convex micro-lenses have a common substrate 43 being a flat transparent plate with opposite sides facing toward and away from the display surface 10 and having an optical contact with the flat surfaces of micro-lenses of the third and second matrices 16, 15 respectively.

Functional flexibility and adaptability of the image switchable apparatus 2 allows using different types of a display component and various variants of its structure in accordance with a further embodiment of the present invention. The display component 3 is generally intended for generating 2-dimensional patterns displaying on its surface 10 (see FIG. 1A) and may comprise a spatial light modulator (SLM). A light emitting diode matrix (LED matrix) can be used as SLM in this type of the display component 3.

Figure 9:
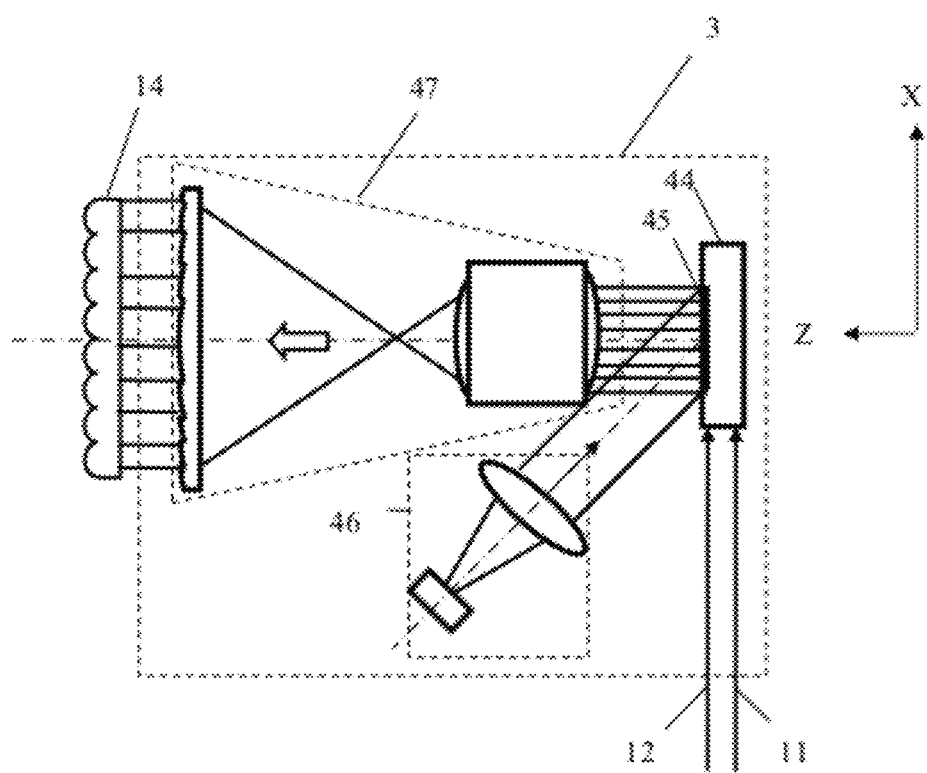
FIG. 9 is a schematic representation of one variant of a display component in a single-color operation mode of the image switchable apparatus according to a further embodiment of the present invention, wherein the display component comprises a spatial light modulator-microdisplay, a light engine and a projective optical system, the schematic representation illustrates also the first matrix of plano-convex micro-lenses.
Figure 10A:
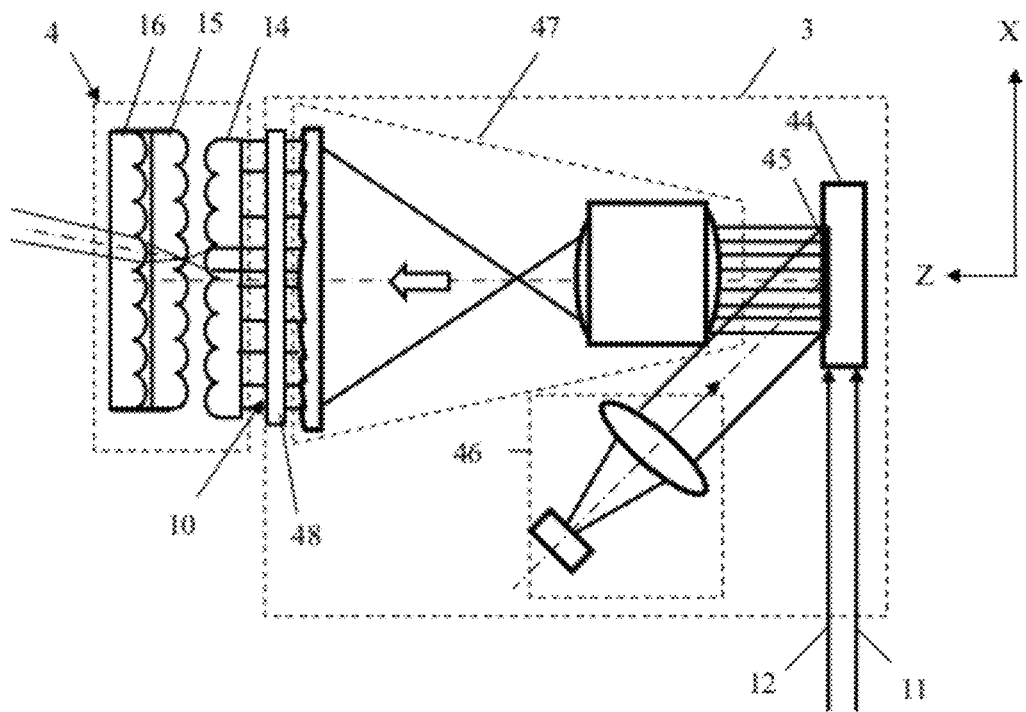
FIG. 10A is a schematic representation of another variant of a display component in a single-color operation mode of the image switchable apparatus according to a further embodiment of the present invention, wherein the display component comprises a spatial light modulator-microdisplay, a light engine, a projective optical system and a vertically scattering optical component, and wherein the vertically scattering optical component is a lenticular matrix of cylindrical plano-convex micro-lenses oriented horizontally. The schematic representation also illustrates an optical matrix component including the first, second, and third lenticular matrices of cylindrical plano-convex micro-lenses oriented vertically.
Figure 12:
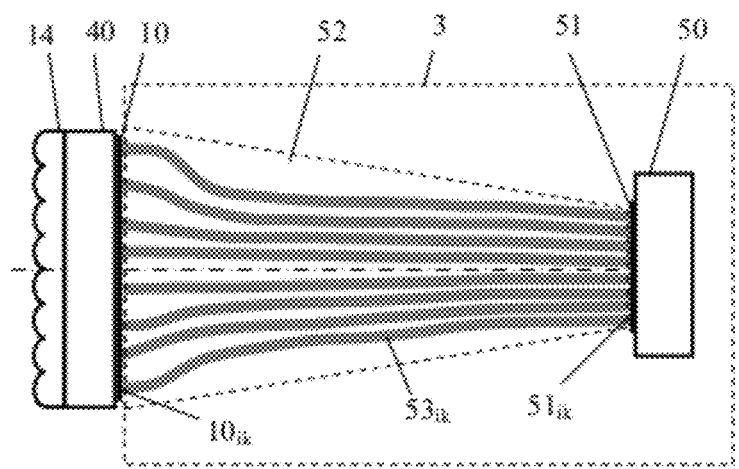
FIG. 12 is a schematic representation of a further variant of a display component in a single-color operation mode of the image switchable apparatus according to a further embodiment of the present invention, wherein the display component comprises a spatial light modulator (SLM) and a projective optical system, wherein the projective optical system is a fiber-optic system for image transmission, and wherein each area of an imaging surface of the SLM is optically coupled to a respective area of the display surface through a respective fiber of the fiber-optic system. The schematic representation also illustrates that a first matrix of plano-convex micro-lenses includes a first substrate.

Schematic representations of several variants of the display component 3 in a single-color operation mode are illustrated in FIGS. 9, 10A, 12. As shown in FIG. 9, one variant of the display component 3 includes: a spatial light modulator-microdisplay (SLM microdisplay) 44 having a microdisplay surface 45, a (digital) data input and a control input, the data input and the control input of the SLM microdisplay 44 being respectively the data input 11 and the synchronization input 12 of the display component 3; a light engine 46 optically coupled to the microdisplay surface 45; and a projective optical system 47 optically coupled to the microdisplay surface 45 and having an output surface being the display surface 10 of the display component 3.

The SLM microdisplay 44 can be implemented, for instance, as a micro-mirror matrix display (MEMS technology).

The projective optical system 47 can be telescopic or telecentric and provides matching sizes (scales) of the microdisplay surface 45 and the first matrix 14 of plano-convex micro-lenses (illustrated also in FIG. 9.) The projective optical system 47 enables image scaling and therefore forming a 3D image of a large size.

Figure 10B:
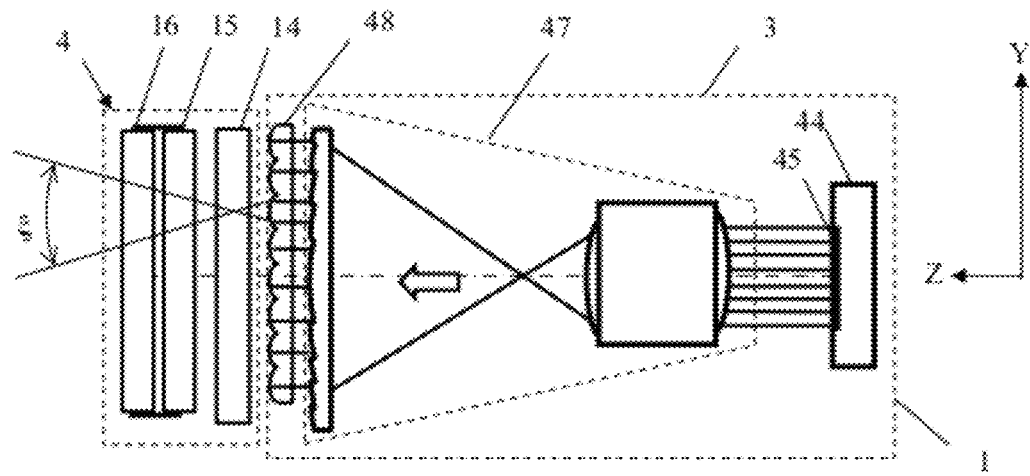
FIG. 10B is a top view of the variant of the display component illustrated in FIG. 10A.

Another variant of the display component 3 in the single-color operation mode is illustrated in FIG. 10A-B. This variant is important when the first, second, and third matrices 14, 15, 16 are respective first, second and third lenticular matrices having their cylindrical plano-convex micro-lenses oriented vertically (along the Y-axis) and includes: a spatial light modulator-microdisplay (SLM microdisplay) 44 having a microdisplay surface 45, a (digital) data input and a control input, the data input and the control input of the SLM microdisplay 44 being respectively the data input 11 and the synchronization input 12 of the display component 3; a light engine 46 optically coupled to the microdisplay surface 45; a projective optical system 47 optically coupled to the microdisplay surface 45 and having an output surface; and a vertically scattering optical component 48 optically coupled to the output surface of the projective optical system 47 and having an output surface, the output surface of vertically scattering optical component 48 being the display surface 10 of the display component 3.

The vertically scattering optical component 48 can be implemented as a lenticular matrix of cylindrical plano-convex micro-lenses oriented horizontally as better shown in FIG. 10B, which is a view on top of the display component 3 illustrated in FIG. 10A. The optical component 48 enables increasing the vertical divergency of optical beams (having an angle $\xi$ in FIG. 3A-B) and hence enlarging vertical size of the field of view (along the Y-axis). It provides improving conditions for observing images due to enlarging their size in the vertical direction. The vertically scattering optical component 48 can also be implemented as an optical layer having holographic scattering elements.

One more variant of the display component 3 in the single-color operation mode includes: a spatial light modulator (SLM) having an imaging surface, a data input and a control input, the data input and the control input of the SLM being respectively the data input 11 and the synchronization input 12 of the display component 3; and a projective optical system optically coupled to the imaging surface of the SLM and having an output surface being the display surface 10 of the display component 3. A light emitting diode matrix (LED matrix) can be used as SLM in this type of the display component 3.

The next variant of the display component 3 in the single-color operation mode includes (as shown in FIG. 12): a spatial light modulator (SLM) 50 having an imaging surface 51, a data input and a control input, the data input and the control input of the SLM 50 being respectively the data input 11 and the synchronization input 12 of the display component 3; and a projective optical system 52 optically coupled to the imaging surface 51 of the SLM 50 and having an output surface being the display surface 10 of the display component 3. The SLM 50 can be implemented as a light emitting diode matrix (LED matrix). Whereas the projective optical system 52 can be implemented as a fiber-optic system for image transmission comprising a plurality of fibers 53 in this type of the display component 3, wherein each area $51_{ik}$ of the imaging surface 51 of the SLM 50 is optically coupled to one respective area $10_{ik}$ of the display surface 10 of the display component 3 through a respective fiber $53_{ik}$ of the fiber-optic system.

Figure 11:
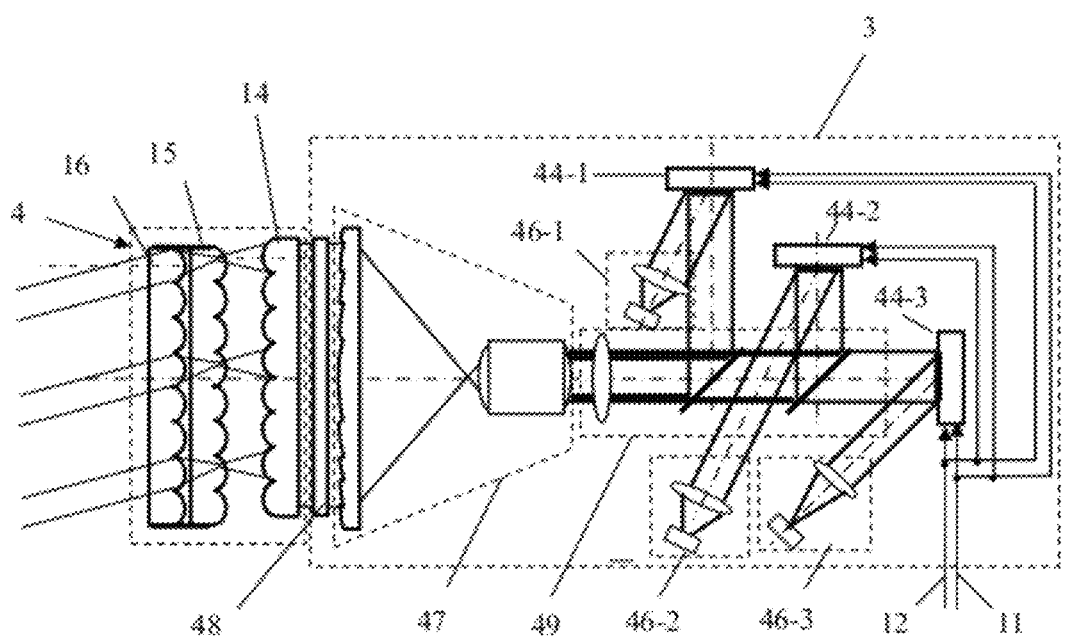
FIG. 11 is a schematic representation of a structure of a display component in a multicolor operation mode of the image switchable apparatus according to a further embodiment of the present invention, wherein the display component comprises a first, second and third spatial light modulator-microdisplays; first, second and third light engines configured to radiate light of a first, second and third selective colors respectively; a superposition optical system configured to spatially superimpose the first, second and third selective colors; a projective optical system; and, a vertically scattering optical component, wherein the vertically scattering optical component is a lenticular matrix of cylindrical plano-convex micro-lenses oriented horizontally. The schematic representation also illustrates an optical matrix component including the first, second, and third lenticular matrices of cylindrical plano-convex micro-lenses oriented vertically.

A schematic representation of a structure of the display component 3 in a multicolor operation mode of the image switchable apparatus 2 according to a further embodiment of the present invention is illustrated in FIG. 11. The multicolor display component 3 includes: a first, second and third spatial light modulator-microdisplays 44-1, 44-2, 44-3; a first, second and third light engines 46-1, 46-2, 46-3 configured to radiate light of a first, second and third selective colors respectively; a superposition optical system 49 configured to spatially superimpose the first, second and third selective colors; a projective optical system 47; and a vertically scattering optical component 48.

For simplicity, further description of the multicolor display component 3 is restricted as if its structure includes only a first and second spatial light modulator-microdisplays (SLM microdisplays) 44-1, 44-2 with respective microdisplay surfaces, data inputs, control inputs (not designated in FIG. 11) and light engines 46-1, 46-2.

It is, of course, understood that the description of the multicolor display component 3 having three or more SLM microdisplays will be apparent to those of ordinary skill in the art when using the description of preceding variants and the following one. The first and second SLM microdisplays 44-1, 44-2 include: a first and second data inputs connected together and a first and second control inputs connected together being respectively the data input 11 and the synchronization input 12 of the display component 3; a first and second light engine 46-1, 46-2, the first light engine 46-1 being optically coupled to a first microdisplay surface of the first SLM microdisplay 44-1 and configured to radiate light of a first selective color, the second light engine 46-2 being optically coupled to a second microdisplay surface of the second SLM microdisplay 44-2 and configured to radiate light of a second selective color.

The superposition optical system 49 is configured to spatially superimpose at least the first and second selective colors and has at least a first and second optical inputs and an optical output. The superposition optical system 49 can be any known one of this kind and has, for example, at least a first and second dichroic mirrors (not designated in FIG. 11) inclined to an axis of the projective optical system 47 at specified angles and optically coupled to its first and second optical inputs respectively and to its optical output. The first and second optical inputs of the superposition optical system 49 are optically coupled to the first microdisplay surface of the first SLM microdisplay 44-1 and the second microdisplay surface of the second SLM microdisplay 44-2 respectively. The projective optical system 47 is optically coupled to the optical output of the superposition optical system 49 and has an output surface. The vertically scattering optical component 48 is optically coupled to the output surface of the projective optical system 47 and has an output surface, the output surface of vertically scattering optical component 48 being the display surface 10 of the display component 3. The vertically scattering optical component 48 can be implemented as a lenticular matrix of cylindrical plano-convex micro-lenses oriented horizontally if the first, second, and third matrices 14, 15, 16 are lenticular matrices of cylindrical plano-convex micro-lenses oriented vertically.

A switchable optical imaging system operates as follows. The user of the switchable optical imaging system 1 in accordance with a first preferred embodiment of the present invention chooses an operation mode to be used and sets the selected mode with the aid of the first and second drivers 5, 6 of the displacement mechanism to provide respective movement of the first matrix 14 of converging micro-lenses axially and the complex of matrices 15, 16 of converging micro-lenses transversely relative to each other. As shown in FIG. 1A, optical beams 20 emanating from the display surface 10 (displaying 2-dimensional patterns) are transformed by matrices 14, 15, and 16 into optical beams 13. The transformed optical beams 13 are projected in the field of view to thereby divide the field of view into one or more adjustable viewing zones (some viewing zones 37 are illustrated in FIG. 2).

In the scanning operation mode the second driver 6 is configured to perform the horizontal movement of the complex of matrices 15, 16 in a reciprocating fashion. In this operation mode the field of view is divided into a plurality of adjustable viewing zones that are scanned consistently with transformed optical beams 13 in the field of view. Whereas, the first driver 5 is configured to perform the axial movement of the first matrix 14 for adjusting a divergency of transformed optical beams 13 and for providing thereby adjacent viewing zones 37 to be contiguous in the field of view. The plurality of viewing zones are intended for projecting therein either (i) corresponding perspective views of the particular 3D image in the 3D operation mode, or (ii) identical 2D images in 2D scanning operation mode. When adjacent viewing zones 37 are contiguous, an observer does not visually perceive changes in image brightness when moving from one viewing zone to another, for example, from zone $37_{ik}$ to zone $37_{(i+1)k}$ or $37_{(i-1)k}$ (see FIG. 2).

In the non-scanning operation mode, a single adjustable viewing (observation) zone is used for projecting therein 2D images of particular interest. In this operation mode the second driver 6 is configured to perform the horizontal movement of the complex of matrices 15, 16 for a third selected distance $\Delta_x$, whereas the first driver 5 is configured to perform the axial movement of the first matrix 14 for adjusting a divergency of optical beams 13 (see FIGS. 6A-B, 7). It allows the single adjustable viewing zone to have a selected viewing direction and selected angular size in the field of view for the purposes of providing, for example, a required level of confidentiality in observing 2D images.

The operation mode switching can be made by changing the position of the first matrix 14 and the complex of matrices 15, 16 along the Z-axis relative each other.

A 3D/2D image switchable apparatus operates as follows. The image switchable apparatus 2 in accordance with the second preferred embodiment of the present invention includes the optical imaging system 1 and performs functions in the scanning and non-scanning operation modes. In addition, the image switchable apparatus 2 performs other and more complicated functions, such as using operation modes in combination, controlling the sequence of 2-dimensional patterns generated by the display component and working parameters of the matrix or matrices movement, etc., that require synchronizing the operation of the image switchable apparatus components. This turns out to be possible due to using the sensor system with the first and second position sensors 7, 8 and the controller 9 in the structure of the image switchable apparatus 2. Signals from the first and second position sensors 7, 8 are used by controller 9 for controlling the performance of the first and second drivers 5, 6 of the displacement mechanism and for providing said synchronization. The controller 9 is used for switching operation modes and adjusting operating characteristics in each operation mode as well.

In the scanning operation mode the second driver 6 is configured to perform the horizontal movement of the complex of matrices 15, 16 in a reciprocating fashion. In this operation mode the field of view is divided into a plurality of adjustable viewing zones that are scanned consistently with transformed optical beams 13 in the field of view. The first driver 5 is configured to perform the axial movement of the first matrix 14 for adjusting a divergency of transformed optical beams 13 and thereby to provide contiguity of adjacent viewing zones 37 in the field of view. Whereas, the controller 9 synchronizes moments of displaying 2-dimensional patterns generated by display component 3 with the matrix or matrices movement or, in other words, with a procedure of scanning the plurality of viewing zones 37 such that each perspective view of the particular 3D image in the 3D operation mode or the identical 2D image in the 2D scanning operation mode is projected in the respective viewing zone 37. And so, for example, in 3D operation mode the plurality of perspective views of a 3-dimensional image of an object or scene are formed in the field of view. As a result, an observer (a viewer) can see these perspective views without dark spaces or overlapping (that means without visually perceiving changes in image brightness if moving from one viewing zone to another). That enables the observer to see this particular 3D image of a better quality without distortion. The peculiarities of several modifications of scanning operation mode were already described herein above in respective sections.

In the non-scanning operation mode, a single adjustable viewing zone is used for projecting therein 2D images of particular interest. In this operation mode the second driver 6 is configured to perform the horizontal movement of the complex of matrices 15, 16 for a third selected distance $\Delta_x$, whereas the first driver 5 is configured to perform the axial movement of the first matrix 14 for adjusting a divergency of optical beams 13. In this operation mode the controller 9 is configured to control the first and second drivers 5, 6 performances for selecting or adjusting the selected angular size $\phi$ and viewing direction (angle $\theta$) of the single viewing zone.

While the present invention has been described in the context of the embodiments illustrated and described herein, the invention may be embodied in other specific ways or in other specific forms without departing from its spirit or essential characteristics. Therefore, the described embodiments are to be considered in all respects as illustrative and not restrictive. It will be apparent to those skilled in the art that various modifications and variations can be made to the switchable optical imaging system and 3D/2D image switchable apparatus without departing from the spirit or scope of the invention as it is described in the appended claims.

What is claimed is:

1. A switchable optical imaging system for transforming optical beams emanating from a display surface displaying 2-dimensional patterns and for projecting transformed optical beams in a field of view to thereby divide the field of view into one or more adjustable viewing zones, comprising:
    a first matrix of converging micro-lenses, with each micro-lens being optically coupled to one respective area of the display surface along a respective optical axis;
    a second matrix of converging micro-lenses optically coupled to the micro-lenses of the first matrix;
    a third matrix of converging micro-lenses coaxially aligned and rigidly jointed to the micro-lenses of the second matrix such that the second and third matrices in combination define a complex of matrices; and
    a displacement mechanism for axially moving the first matrix or the complex of matrices relative to each other and for transversely moving the first matrix or the complex of matrices relative to each other; and wherein the displacement mechanism includes at least:
        a first driver configured to axially move (i) the first matrix relative to the complex of matrices, or (ii) the complex of matrices relative to the first matrix; and
        a second driver configured to horizontally move (i) the first matrix relative to the complex of matrices, or (ii) the complex of matrices relative to the first matrix, and
        a third driver configured to vertically move (i) the first matrix relative to the complex of matrices, or (ii) the complex of matrices relative to the first matrix.

2. The switchable optical imaging system of claim 1 wherein the micro-lenses of the second matrix are coaxially aligned with micro-lenses of the first matrix.

3. The switchable optical imaging system of claim 1 wherein the micro-lenses of the first second, and third matrices have respective first, second, and third focal lengths, and wherein the first, second, and third focal lengths are the same.

4. The switchable optical imaging system of claim 1 wherein the first, second, and third matrices of converging micro-lenses are respective first, second, and third matrices of plano-convex micro-lenses.

5. The switchable optical imaging system of claim 4 wherein the first, second, and third matrices of plano-convex micro-lenses have respective first, second, and third pitches between their micro-lenses, and wherein the first, second, and third pitches are the same.

6. The switchable optical imaging system of claim 4 wherein the first, second, and third matrices of plano-convex micro-leases are respective first, second, and third lenticular matrices having their cylindrical micro-lenses oriented vertically.

7. The switchable optical imaging system of claim 4 wherein the flat surfaces of micro-lenses of the first matrix face toward the display surface, whereas the flat surfaces of micro-lenses of the second and third matrices face away from the display surface.

8. The switchable optical imaging system of claim 4 wherein the flat surfaces of the micro-lenses of the first and third matrices face toward the display surface, whereas the flat surfaces of the micro-lenses of the second matrix face away from the display surface.

9. The switchable optical imaging system of claim 4 wherein the first, second, and third matrices of plano-convex micro-lenses have respective first, second, and third substrates, with each substrate being a flat transparent plate having an optical contact with the flat surfaces of micro-lenses of the respective matrix.

10. The switchable optical imaging system of claim 8 wherein the second and third matrices of plano-convex micro-lenses have a common substrate being a flat transparent plate with opposite sides facing toward and away from the display surface and having an optical contact with the flat, surfaces of the micro-lenses of the third and second matrices respectively.

* * * * *